US008203600B2

(12) United States Patent
Plut

(10) Patent No.: US 8,203,600 B2
(45) Date of Patent: Jun. 19, 2012

(54) PROJECTION-TYPE STEREOSCOPIC DISPLAY

(75) Inventor: William J. Plut, Los Altos, CA (US)

(73) Assignee: Transpacific Image, LLC, Wilmington, DE (US)

( * ) Notice: Subject to any disclaimer, the term of this patent is extended or adjusted under 35 U.S.C. 154(b) by 413 days.

(21) Appl. No.: 12/478,259

(22) Filed: Jun. 4, 2009

(65) Prior Publication Data

US 2010/0309293 A1    Dec. 9, 2010

(51) Int. Cl.
    *H04N 13/04* (2006.01)
(52) U.S. Cl. ......................................... 348/51
(58) Field of Classification Search .............. 348/51; 353/7, 8, 10
    See application file for complete search history.

(56) References Cited

U.S. PATENT DOCUMENTS

| 6,793,341 | B2 * | 9/2004 | Svardal et al. ............... 353/8 |
| 2003/0156260 | A1 | 8/2003 | Putilin | |
| 2007/0132953 | A1 | 6/2007 | Silverstein | |
| 2008/0304013 | A1 * | 12/2008 | Seo ............................. 353/8 |
| 2009/0257120 | A1 * | 10/2009 | Nelson et al. ............... 359/465 |
| 2010/0214537 | A1 * | 8/2010 | Thomas ....................... 353/7 |
| 2010/0309390 | A1 * | 12/2010 | Plut ............................ 348/744 |

FOREIGN PATENT DOCUMENTS

WO    2007/064139 A1    6/2007

OTHER PUBLICATIONS

International Search Report and Written Opinion for PCT/US2010/030228 dated Jun. 22, 2010, 15 pages.

* cited by examiner

*Primary Examiner* — Larry Donaghue
(74) *Attorney, Agent, or Firm* — Turocy & Watson, LLP

(57) ABSTRACT

A projection type stereoscopic display system (and corresponding methodology) is provided. The system comprises a light source, two or more projection chambers, and a switch. The switch receives a plurality of light beams and diverts the beams in a predetermined sequential order to each projection chamber. The projection chamber projects a first image on a first receiving surface and the second image on a second receiving surface parallel with the first receiving surface so that a viewer observes the first and second images simultaneously thereby establishing stereoscopic effects.

18 Claims, 21 Drawing Sheets

PROJECTION-TYPE STEREOSCOPIC DISPLAY

BACKGROUND

In general, a projection-type display or video projector displays an image that corresponds to a video signal upon a projection screen or other surface (e.g., wall). One of the major characteristics of projection-type display devices is their ability to display images that are larger in size than images produced by other displays such as CRT (cathode-ray tube) or LCD (liquid crystal display). Projection-type display devices have relatively smaller size compared to the image capable of being projected.

Traditionally, these video projection devices are used for business presentations, classroom training, home theater, etc. For example, projection devices are widely used in many schools and institutions to project onto an interactive white board during the course of teaching students.

Most modern projection devices are capable of correcting distortion, focus, and other inconsistencies by way of manual controls. However, to date, conventional projection-type display devices have been designed in a fixed CRT/LCD traditional mindset, such as single video output per device, or a lack of portability for a large image.

DETAILED DESCRIPTION

Figure 1:
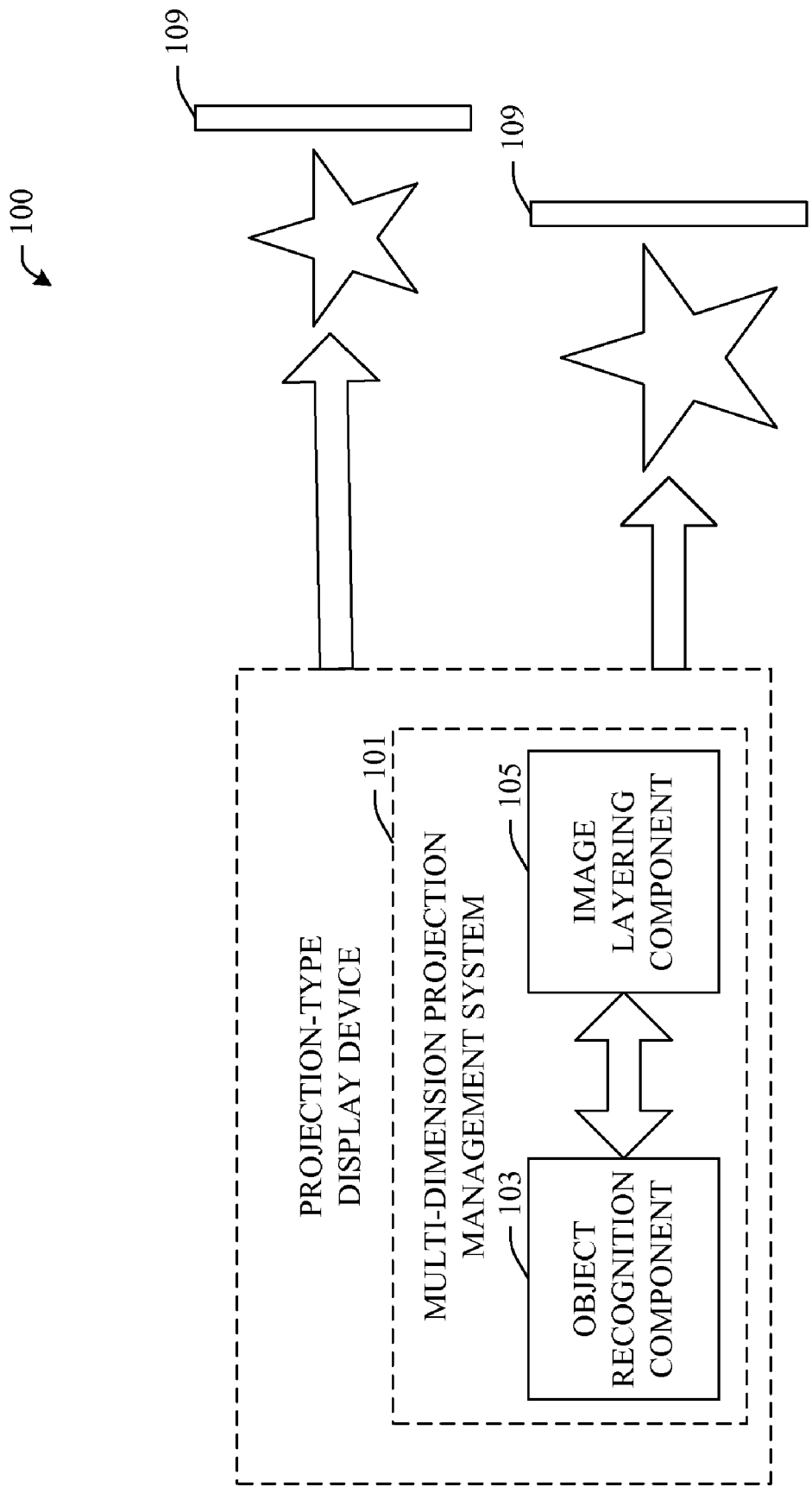
FIG. 1 illustrates an example block diagram of a system that projects stereoscopic images in accordance with aspects of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component," "module," "unit," and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates projection-type stereoscopic display in accordance with aspects of the innovation. Generally, the system 100 employs a three-dimension projection management system 101 for a projection-type display device that is capable of projecting multiple images upon multiple surfaces thereby generating a three-dimensional (3D) and stereoscopic effect. As will be understood, the innovation can be employed in a variety of scenarios including, but not limited to, virtual reality scenarios, video game environments, entertainment environments, or the like.

In aspects, the three-dimension projection management system 101 includes an object recognition component 103 and an image layering component 105 that together prepare and facilitate rendering of three-dimensional video. As will be described in greater detail below, the object recognition component 103 can analyze data thereby establishing objects and perspectives of each object represented by the data. The image layering component 105 establishes where and how an object is to be displayed. As illustrated in FIG. 1, one or more projection surfaces 109 can be employed to dimensionally project objects. As will be understood, by displaying multiple images upon multiple surfaces 109, it is possible to establish a three-dimensional or stereoscopic effect. The three-dimensional effect is obtained since each image includes a two-dimensional (2D) image and the two projection receiving surfaces are separated by a distance, D, normal to the projected images, thereby granting a third dimension to the multiple displays. Image objects on the two images may then move within an image in 2D and/or move between images in 3D.

Also, the distance between images enables the perception of parallax. Parallax is an apparent displacement or difference of orientation of an object viewed along two different lines of sight, and is measured by the angle or semi-angle of inclination between those two lines. Nearby objects have a larger parallax than more distant objects when observed from different positions, so parallax can be used to determine distances. A human perceptual characteristic is also called motion parallax since motion parallax provides depth perception to a viewer because, as a viewer moves, objects that are closer to the viewer move farther across the field of view than objects that are in the distance. Parallax is an important component to the perception of 3D space for a person. Providing parallax in system 100 offers a rich experience for a viewer and offers the ability for content providers to give a viewer actual 3D content and perception.

In graphical applications, such as video games, the scene can be constructed of independent layers by hardware and/or software having support for such layers that are scrolled at different speeds when the player/cursor moved. This gives some layers the appearance of being farther away than others and is useful for creating an illusion of depth. For instance, as a user's viewpoint moves side to side, the result of multiple layers in parallax is that the objects in the distance (more distant layers) appear to move more slowly than the objects close to the camera (nearer layers).

Figure 2:
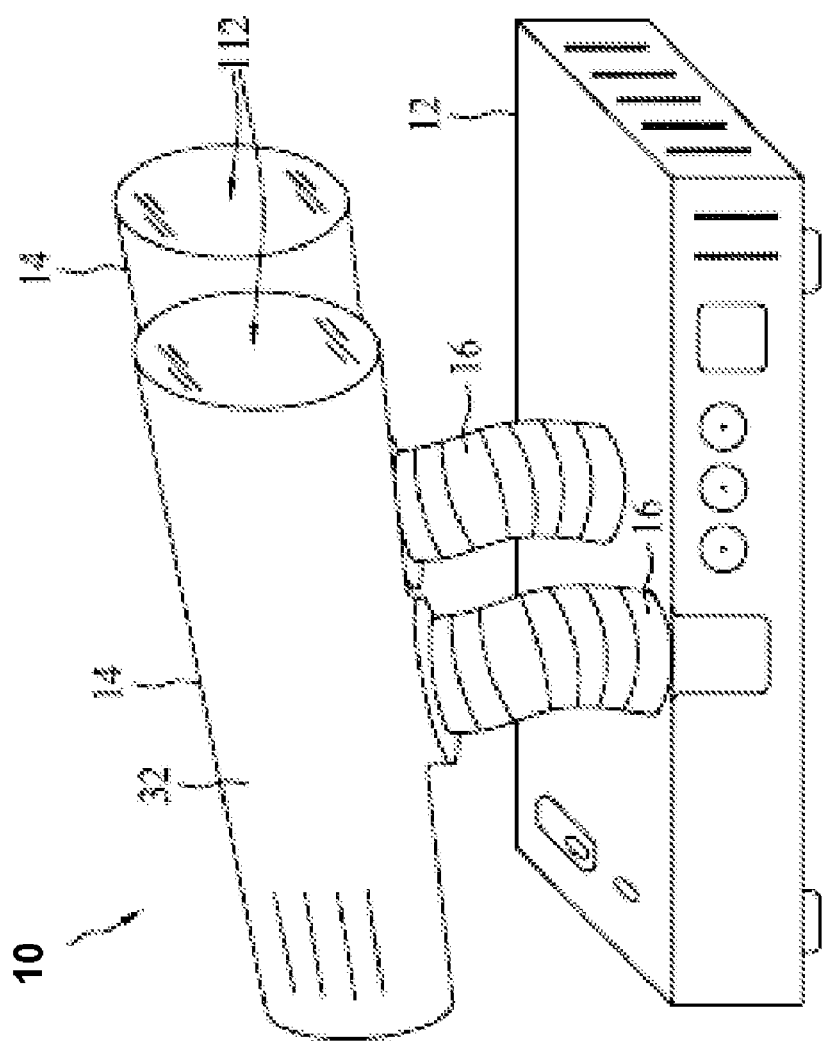
FIG. 2 shows a projection type stereoscopic projection display device in accordance with one of the present embodiments.
Figure 3:
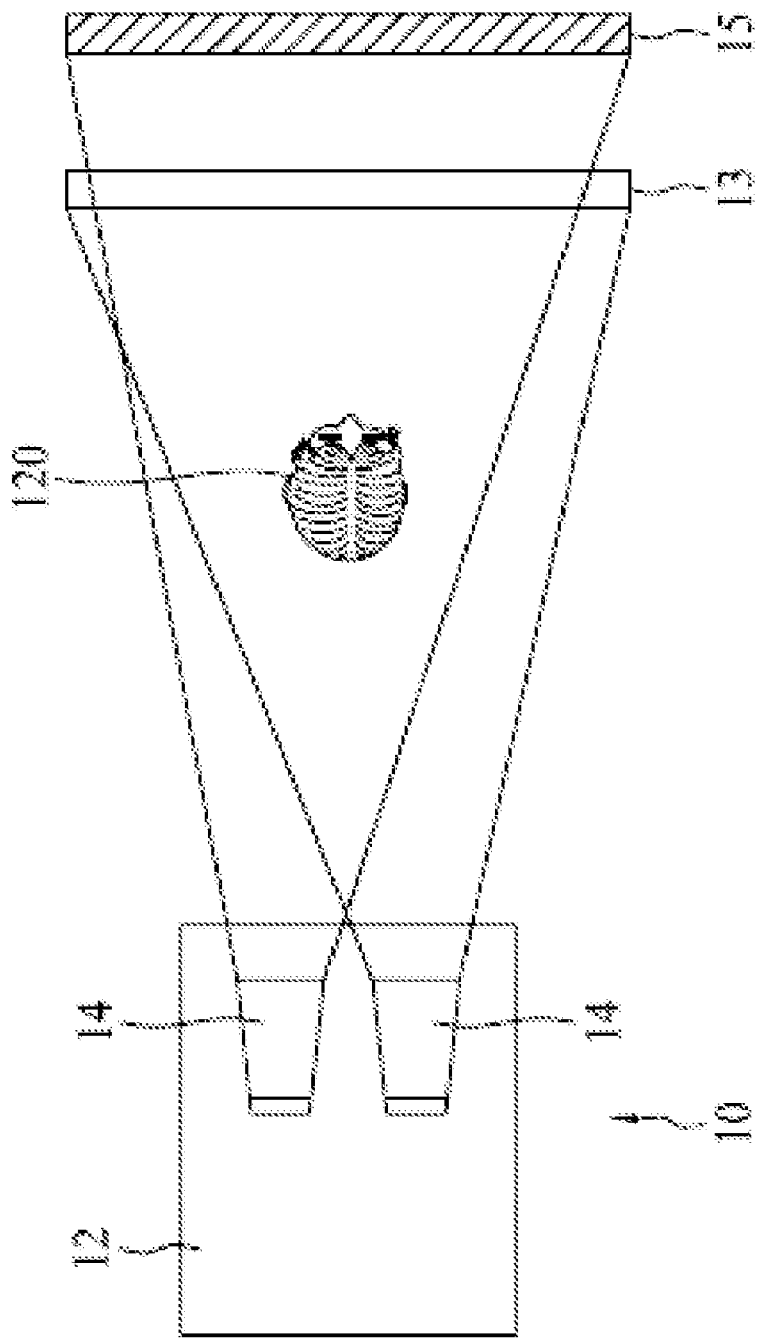
FIG. 3 shows an example top view of the display device casting two video images on front and back receiving surfaces.

FIG. 2 shows a projection type stereoscopic display device 10 in accordance with one of the present embodiments. As shown, the display device 10 comprises a base 12, a plurality of projection chambers 14 having respective light sources 112 that output light from the chambers 14, and a plurality of positional interfaces 16, e.g., mechanical means for positioning the plurality of projection chambers 14. The projection type stereoscopic display device 10 is capable of producing and projecting at least two video images on two or more receiving surfaces. FIG. 3 shows an example top view of the display device 10 casting two video images on two receiving surfaces 13 and 15. The projection type stereoscopic display device 10 creates a stereoscopic visual effect by separately displaying a near image and a far image. The distance between the two receiving surfaces creates physical distance between the two images. In this example, the receiving surfaces (13, 15) are designed to receive only one of the video images so that a viewer positioned in front of the receiving surfaces can simultaneously see the layered images. The layered images provide actual physical separation between visual representations on the front and rear receiving surfaces 13 and 15 to present stereoscopic display.

Multiple techniques are contemplated to achieve receiving surface selectivity of the projected images from device 10. In one embodiment, the front receiving surface 13 comprises a first polarized film that allows the first image with the first polarized light to be formed thereon. Similarly, the rear receiving surface 15 comprises a second polarized film that allows the second image with the second polarized light transmitted through the first receiving surface to be formed thereon. Other receiving surface selectivity mechanisms are suitable for use, such as lenticular lenses on each receiving surface that are selective to light entering from different angles corresponding to the different casting angles of the two projection chambers. Other optional structures and mechanisms of the projection type stereoscopic display device 10 will be explained in detail at following paragraphs.

The base 12 is configured to maintain position of display device 10, e.g., relative to a stationary object. In one embodiment, the base 12 includes a relatively flat bottom that allows the display device 10 to rest upon a flat surface such as a table or a desk. One or more high friction pads can attach to a bottom wall of the base 12 to increase static friction with the flat surface. The base 12 may also comprise a receiving slot that allows modular attachment of functional accessories for display device 10. For example, the slot may receive a clip attachment that comprises a spring-powered clip for clamping the base 12 onto a stationary object. This allows the base 12 and the display device 10 to be mounted on non-flat or non-horizontal surfaces such as vertical walls of bookshelves and cubicles, and personal clothing or accessories such as belts or straps, for example. The base 12 may also comprise another slot on its bottom side, dimensioned the same, to permit reception of the functional accessories on the bottom side of base 12.

A housing can protect internal components within base 12, define outer dimensions of the base 12, and define dimensions of an inner light source chamber. As shown, the housing can be substantially rectangular and may comprise four sidewallsOne or more walls of the housing may also include air vents that allow air flow between the inner chamber and an environment external to the housing. In another embodiment, the housing can include a more rounded or contoured shape than that shown in FIG. 2 and does not necessarily include orthogonal walls or a rectangular shape. Thus, any shape, whether polygonal or irregular can be implemented for a housing.

The projection chamber 14 includes components responsible for the production of images based on received light and received video data, and components responsible for the projection of those images. The projection chamber 14 comprises a projection chamber housing 32, an optical modulation device (e.g., within projection chamber housing 32, not shown in FIG. 2), and an output projection lens system (e.g., within projection chamber housing 32, not shown in FIG. 2). The optical modulation device selectively transmits light generated by a light source in the base 12 according to video data included in a video signal provided to the optical modulation device, and will be described in further detail with respect to FIG. 5. The projection lens system outputs light transmitted by the optical modulation device along a projection path, and will also be described in further detail with respect to FIG. 5.

In operation, a light source within the base 12 generates light which is provided to the optical modulation device within projection chamber 14 as a luminous flux. In one embodiment, one or more optical fibers transmit light from the light source within the base 12 to the optical modulation device within projection chamber 14. The optical modulation device selectively transmits light according to video data in a signal that corresponds to an image to be projected. The projection lens system enlarges and projects an image formed by the optical modulation device. The image is cast with a splay angle such that the image enlarges as the distance to the receiving surface 13 and 15 increases.

Referring again to FIG. 2, the projection chamber 14 comprises a projection chamber housing 32 that protects internal components of projection chamber 14, and defines outer and inner dimensions of projection chamber 14. As shown, the projection chamber housing 32 is about cylindrical, except for an added receiving interface on its bottom side. The projection chamber housing 32 has a cylindrical axis that is about collinear with output projection path. An output optical projection lens of the projection lens system forms and seals the forward end of projection chamber 14. In a specific non-limiting embodiment, the average diameter of cylindrical projection chamber housing 32 is relatively within ten percent of the diameter of output optical projection lens.

In another non-limiting embodiment, the projection chamber housing 32 tapers slightly such that its forward end is slightly larger than an aft end, resulting in a slightly frusto-conical shape where the output optical projection lens is coupled to the larger end.

Shape and design of the projection chamber 14 may vary. For example, the forward end of projection chamber 14 may be rounded to accommodate a circular output lens while aft end is cornered to accommodate a rectangular optical modulation device and associated support components that are locally contained better by a rectangular housing. The projection chamber housing 32 defines an inner chamber as described in further detail with respect to FIG. 8. The projection chamber housing 32 comprises a suitably rigid material for structural rigidity of projection chamber 14 and internal component protection. A lightweight and stiff plastic or aluminum is suitable for several embodiments.

A receiving interface is disposed on the lower side of projection chamber 14 and permits coupling between the projection chamber 14 and a positional interface 16. The receiving interface also permits containment and protection of display device components that do not entirely fit within the projection chamber 14, or components that require spatial arrangements outside the projection chamber 14. In one embodiment, the receiving interface housing comprises the same material as the projection chamber housing 32 and extends the interior projection chamber provided by the projection chamber housing 32.

The positional interface 16 allows the projection chamber 14 to be moved relative to the base 12, and allows the projection chamber 14 to maintain a constant position relative to base 12 after being moved. Thus, the positional interface 16 allows a user to point the projection chamber 14 and manipulate the position of an output image projected by the display device 10 with ease. In one embodiment, the positional interface 16 comprises a ball and socket combination that permits relative rotational movement between the projection chamber 14 and the base 12. In another embodiment, the positional interface 16 comprises corrugated metal tubing that is sufficiently rigid to hold a position for projection chamber 14, while compliant enough for a user to bend the tubing to achieve a desired position and orientation for the projection chamber 14.

The positional interface 16 couples to the base 12 and couples to the projection chamber 14. For the embodiment shown in FIG. 2, the positional interface 16 comprises an upper end that attaches to the projection chamber housing 32 and a lower end that attaches or couples to the housing of base 12. More specifically, a projection chamber housing 32 portion of receiving interface allows attachment to the upper end of positional interface 16, while a central portion of a top wall of the housing allows attachment to the lower end of positional interface 16. As shown, the positional interface 16 couples to the projection chamber housing 32 at a location between an aft end of projection chamber 14 and a forward end that includes the output optical projection lens.

In one embodiment, the upper end of positional interface 16 couples at a location relatively close to a center of mass of the projection chamber 14 to minimize mechanical moments transmitted onto the base 12, e.g., those resulting from the displacement of center of mass of the projection chamber 14 away from a center of mass for the base 12. In another embodiment, the base 12 includes a recessed groove in a top wall that allows the positional interface 16 to be folded or collapsed down into the top wall, thereby decreasing the profile of display device 10 during non-use.

Figure 4:
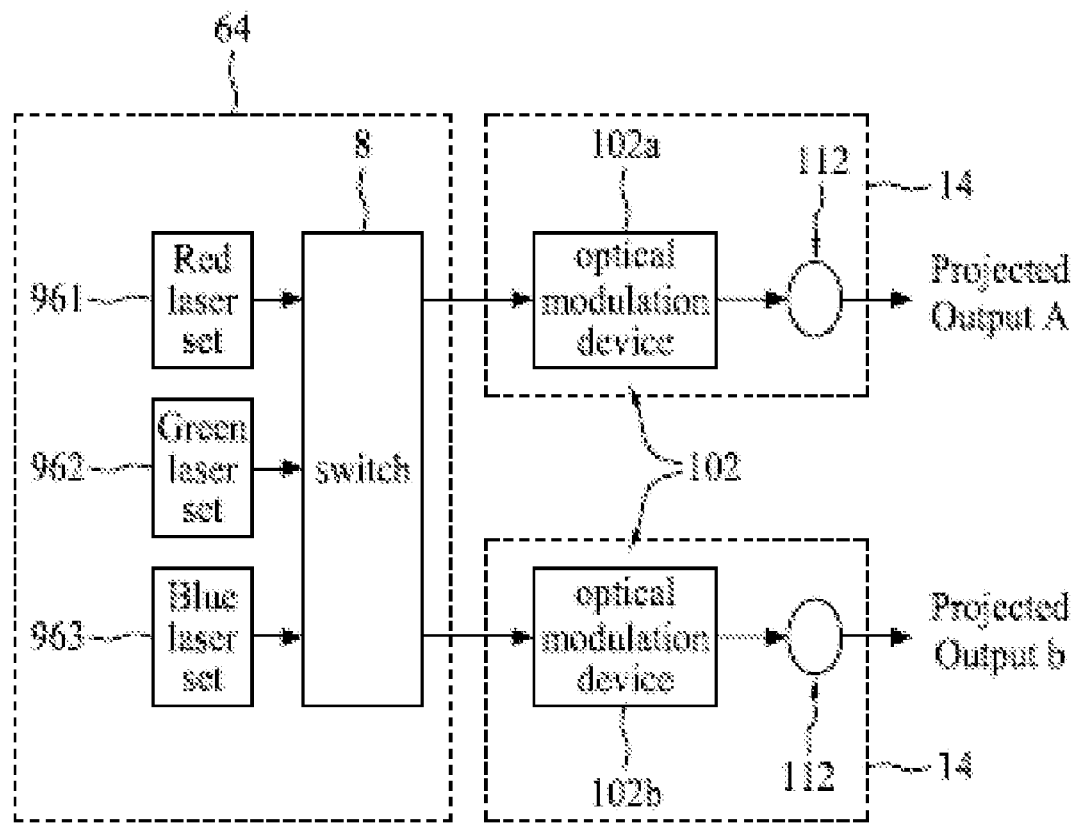
FIG. 4 shows an example schematic chart illustrating optical path from a light source to each projection output in accordance with one of the present embodiments.

FIG. 4 illustrates an example schematic chart illustrating optical path from a light source 64 configured in the base 12 (FIG. 2) to each projection chamber 14 in accordance with one of the present embodiments. The light source 64 includes a plurality of laser sets, such as a red laser set 961, a green laser set 962 and a blue laser set 963, generating a plurality of laser beams with different colors from one another, such as the red laser beam, the green laser beam and the blue laser beam. As shown in FIG. 4, the light source 64 also includes a switch 8 which receives the red laser beam, the green laser beam and the blue laser beam from the red laser set 961, the green laser set 962 and the blue laser set 963 respectively. Any of the embodiments described herein with lasers can also be implemented with light emitting diodes (LEDs), or vice versa, or with a combination of lasers and LEDs.

Each of the projection chambers 14 includes an optical modulation device 102 (e.g., 102a and 102b) and a projection lens system 112. The optical modulation device 102 is configured to selectively transmit light generated by the light source 64 according to receiving video data. The projection lens system 112 is configured to output light transmitted by the optical modulation devices 102 along predetermined projection paths reflected by outputs A and B.

The switch 8 is capable of diverting the red laser beam, the green laser beam and the blue laser beam in a predetermined sequential order to each of the two projection chambers 14. For instance, in one embodiment, there are three modes corresponding to a first time frame, a second time frame and a third time frame, respectively.

The first mode—during the first time frame, the red laser beam is transmitted from the switch 8 to the optical modulation device 102a; the green laser beam is transmitted from the switch 8 to the optical modulation device 102b.

The second mode—during the second time frame, the green laser beam is transmitted from the switch 8 to the optical modulation device 102a; the blue laser beam is transmitted from switch 8 to the optical modulation device 102b.

The third mode—during the third time frame, the blue laser beam is transmitted from the switch 8 to the optical modulation device 102a; the red laser beam is transmitted from the switch 8 to the optical modulation device 102b.

Lasting time of the first time frame, the second time frame and the third time frame may be identical to one another in one embodiment. Namely, the first mode, the second mode and the third mode take turns evenly to be applied in the light source 64. In some other embodiments, lasting time of the first time frame, the second time frame and the third time frame may differ from one another according to system requirement. Adjustment toward such lasting time can be used as a color control manner of the display device 10.

Figure 5:
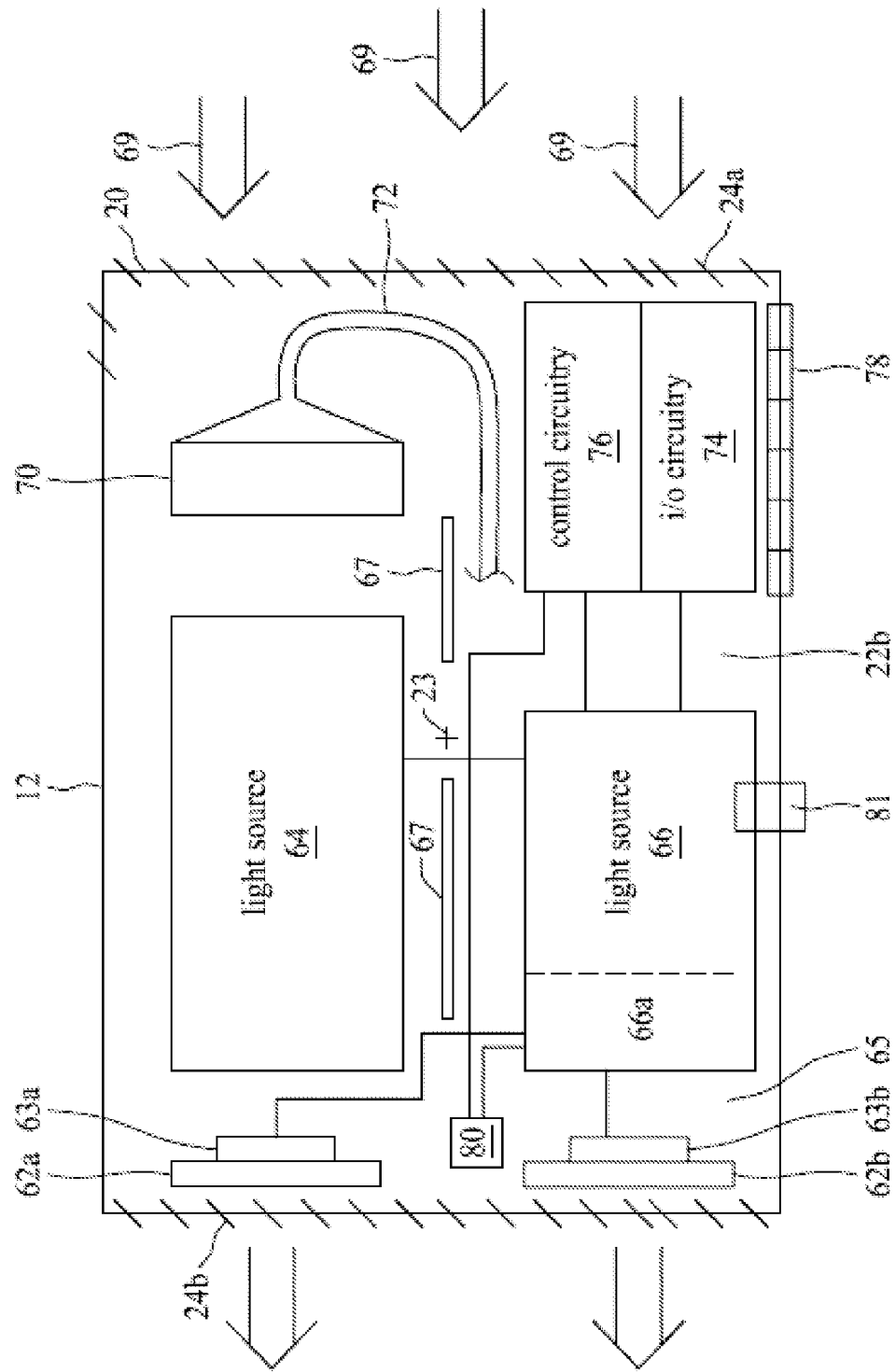
FIG. 5 shows a simplified top view schematic of components within base in accordance with some embodiments.

FIG. 5 shows a simplified top view schematic of components within the base 12 in accordance with some embodiments. A light source chamber 65 is defined in volume and shape by inside walls 22a-f of the base 12. The light source chamber 65 comprises fans 62a and 62b, a light source 64, a power supply 66, a fiber-optic interface 70, a fiber-optic cable 72, an input/output circuitry 74, a control circuitry 76, and input/output interfaces 78.

In one embodiment, the base 12 is designed or configured to maintain balance of the display device 10. In this case, the base 12 may be designed to maintain balance for any position of the projection chamber 14 relative to the base 12 while the base 12 rests on a flat surface. Thus, components within the base 12 may be arranged and situated such that they cumulatively provide a center of mass 23 relatively close to a geometric center for a footprint of base 12. As shown in FIG. 5, the light source 64 and the power supply 66, which are typically the heaviest components in the base 12, are disposed relatively central to the footprint in one dimension and on opposite sides of center of mass 23 in the other dimension. In a specific embodiment, components within base 12 are arranged according to their weight in order to substantially balance moments about the center of mass 23. The exact position of each component will depend of on the number and type of components and base 12 layout. In addition, the housing 20 may be sized to provide a wide enough footprint to balance moments produced by various positions and orientations of the projection chamber 14 away from the center of mass 23 for the base 12.

Fans 62a and 62b move air through the light source chamber 65 for cooling components within the light source chamber 65. In one embodiment, fans 62a and 62b draw external air into the light source chamber through inlet air vents 24a on one side of the base 12 and exhaust heated air out of the light source chamber through exhaust air vents 24b after the air has cooled internal components of the base 12 and the walls of housing 20. It is to be appreciated that fans 62a and 62b, inlet air vents 24 and exhaust air vents 24b placement will vary with internal components placement within light source chamber 65. Specifically, fan 62a and 62b placement, and airflow patterns effected by fans 62 within light source chamber 65, is designed according to individual temperature regulation requirements and heat generation contributions of components within the base 12. The light source 64 and the power supply 66 generate the largest proportion of heat within the base 12, while the control circuitry 76 and the input/output circuitry 74 call for tighter temperature regulation.

Correspondingly, inlet air 69 passing in through inlet air vents 24a initially passes and cools the control circuitry 76 and the input/output circuitry 74 while the air is relatively cool, and then passes across the power supply 66 and the light source 64, and eventually exits out through exhaust air vents 24b. The exhaust air may also cool fan motors 63a and 63b, which rotate fans 62a and 62b, respectively. In one embodiment, multiple fans are used to permit a lower profile for the base 12. It is to be appreciated that the number and size of fans used will depend on heat generation within the display device 10 and a desired air flow to maintain one or more heat dissipation goals. The light source chamber 65 may also include one or more vertical or horizontal airflow guides 67 within the light source chamber 65 to direct and distribute airflow as desired. In one embodiment, the light source 64 comprises one or more diode laser arrays and one or more circuit boards to power and control the diode lasers. In this case, the airflow guides 67 are arranged to direct cool air across the surfaces of each circuit board. As will be described in further detail below, fans 62a and 62b may also be responsible for drawing air through positional interface 16 to/from the projection chamber 14 to cool the optical modulation device included therein.

Figure 6:
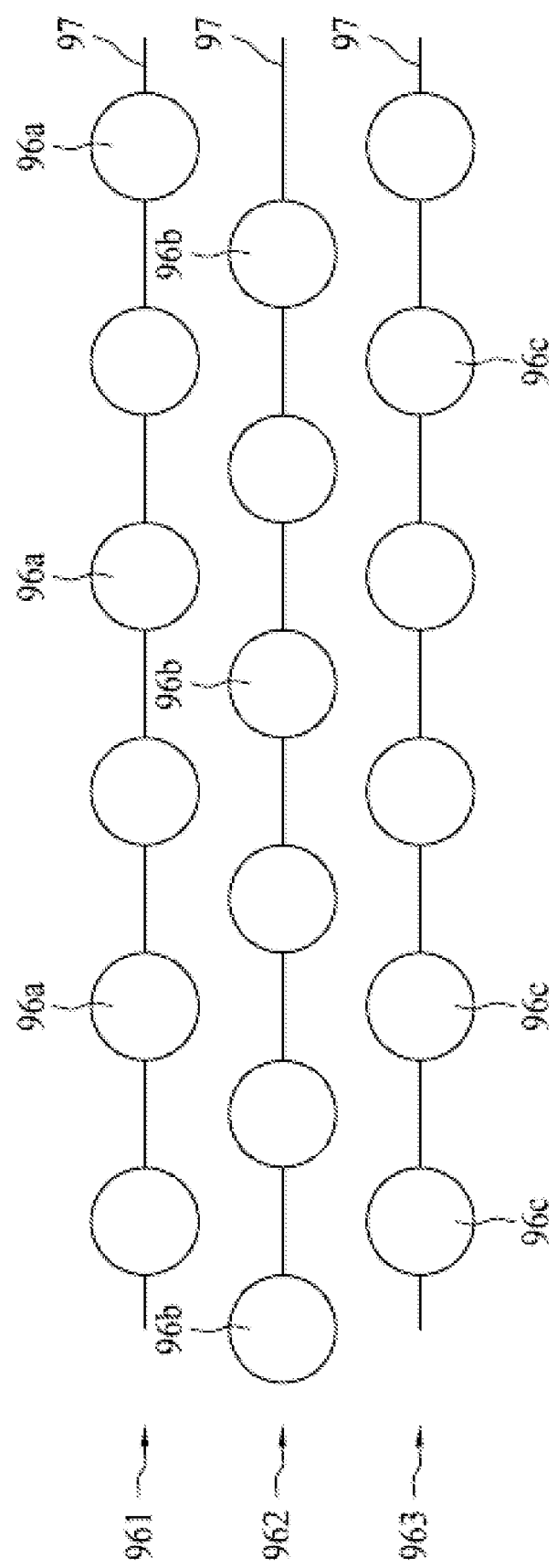
FIGS. 6 and 7 illustrate simplified front and top perspective views, respectively, of a light source configuration in accordance with some embodiments.
Figure 7:
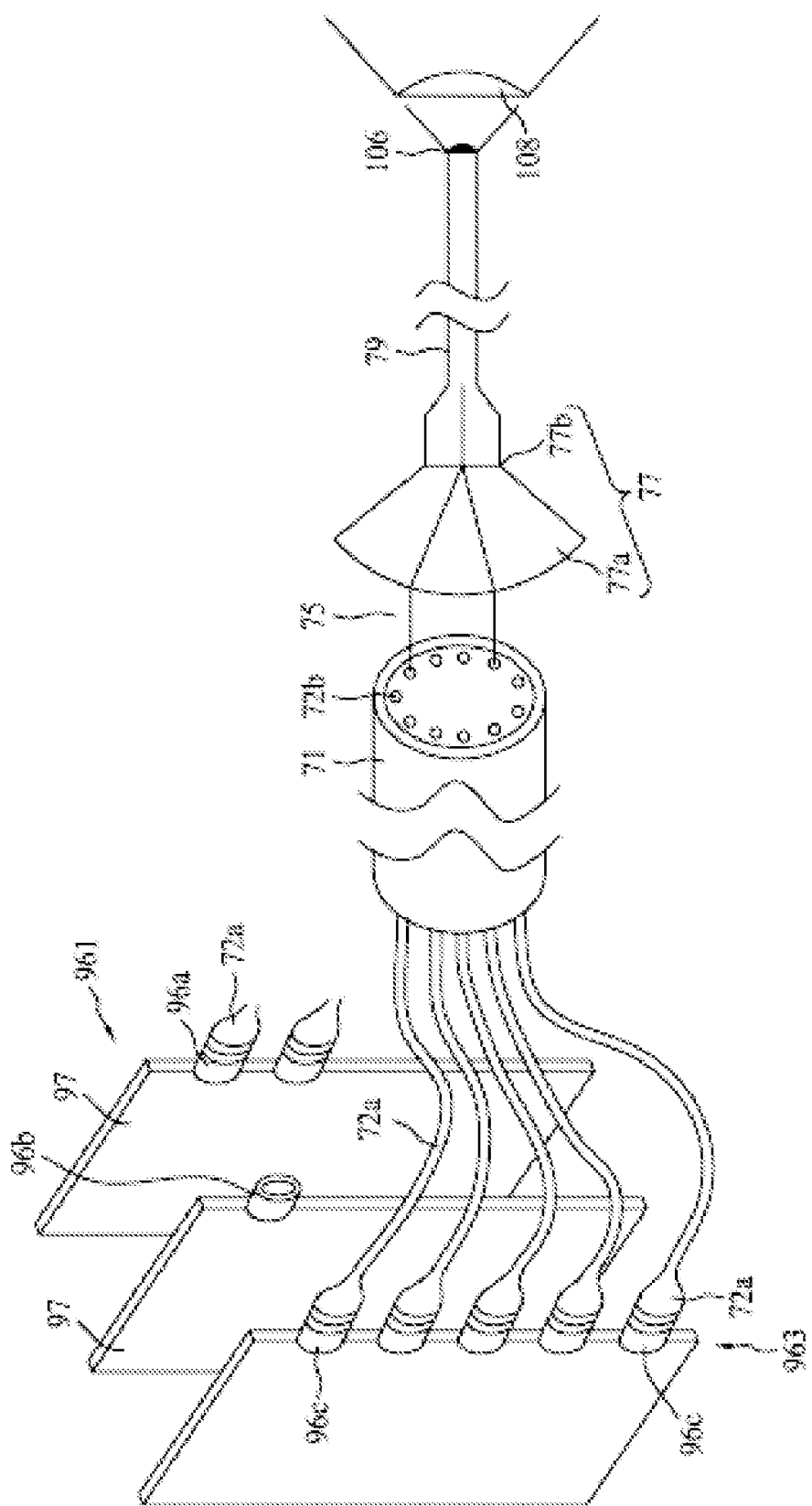

FIGS. 6 and 7 illustrate simplified front and top perspective views, respectively, of a light source configuration in accordance with some embodiments. In this case, the light source chamber 65 includes an array of lasers that generate collimated light. Lasers may comprise diode lasers and diode pumped solid-state (DPSS) lasers, for example. The collimated light produced by a diode laser differs from radiant light and is characterized by light that is output with about the same output direction, and significantly in phase.

The array of lasers may comprise one or more red diode lasers 96a, one or more green diode lasers 96b, and one or more blue diode lasers 96c. A red laser set 961 comprises a plurality of red diode lasers 96a. A green laser set 962 comprises a plurality of green diode lasers 96b. A blue laser set 963 comprises a plurality of blue diode lasers 96c. The number and power of lasers for each color is scaled according to a desired light intensity output for the display device 10 and according to the light sensitivity of a viewer to each color, as one skilled in the art will appreciate. Each laser diode is installed on a circuit board 97, which mounts, and provides electrical control for each laser diode installed thereon. Multiple lasers may be mounted on a single board 97 to reduce space occupied by the light source 64. Including multiple lasers for a single color allows output luminosity of the display device 10 to vary with the number of lasers turned on for each color, and allows for redundant control of light generation by lasers. Thus, one or more of the lasers may be turned off if less light intensity is desired, longevity of individual lasers benefits from periodic shut-down, or power conservation for the display device 10 is preferred.

Figure 8:
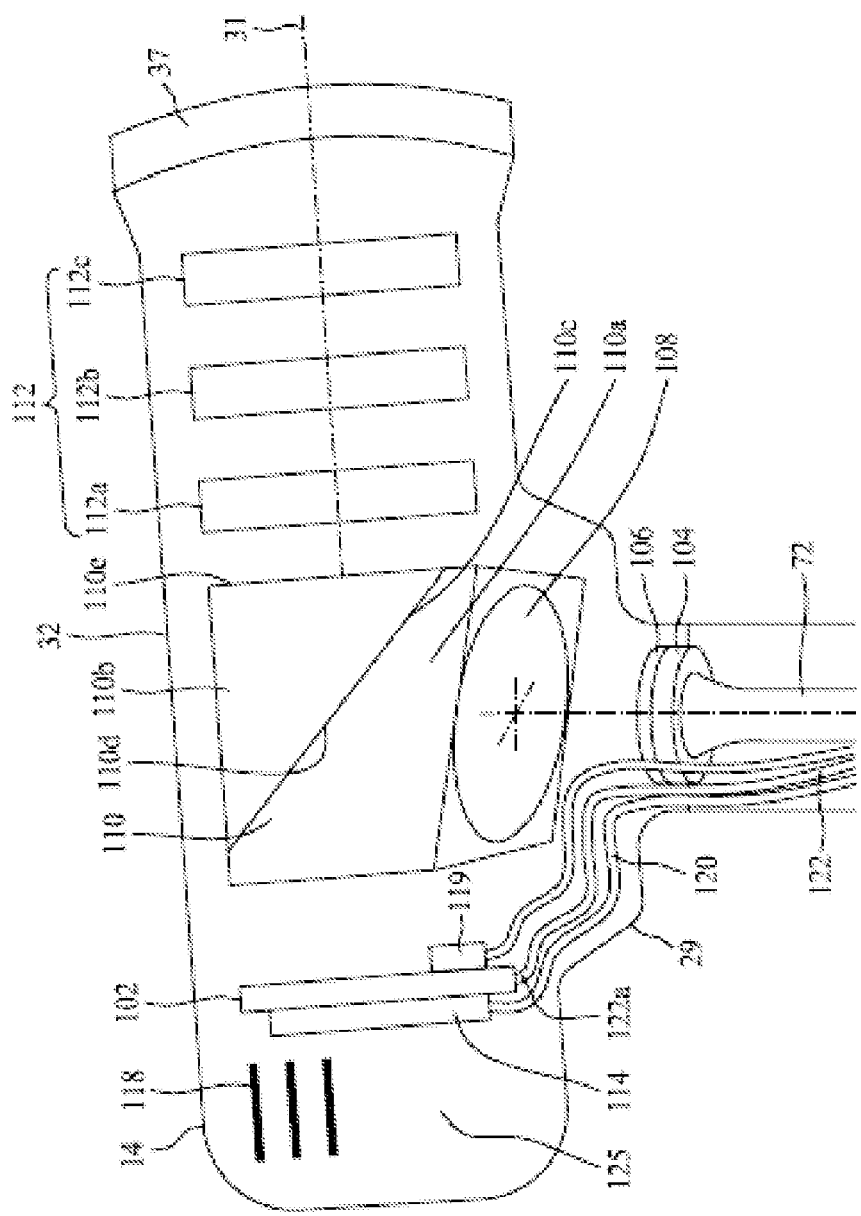
FIG. 8 shows that the light output from the lasers can be provided to fiber-optic cabling in accordance with aspects.

Referring to FIG. 8, in one embodiment, light output from the lasers is provided to the fiber-optic cabling 72. The fiber-optic cabling 72 includes one or more fiber optic cables that transmit light from each laser along multiple or common optical paths to relay optics systems 106 and 108 disposed along the light path between an exit end of fiber-optic cabling 72 and an optical modulation device 102.

Referring again to FIG. 7, each cable 72 has an inlet end 72a that receives light from a red diode laser 96a, a green diode laser 96b or a blue diode laser 96c; and each cable 72 also has an outlet end 72b that outlets the laser light for transmission to relay optics systems 106 and 108, and subsequent transmission to the optical modulation device 102. Since fiber-optic cabling 72 may be bent and flexibly positioned, the fiber-optic cabling 72 advantageously allows light transmission between lasers and relay optics systems regardless of the relative position and orientation between the lasers and optics systems. For example, this allows flexible arrangement of lasers, relay optics systems 106 and 108 and a prism 910 (FIG. 9), which may be used to improve space conservation within the base 12, decrease the footprint of base 12, and minimize the display device 10 size. In addition, the flexible fiber-optic cabling 72 also allows the positional interface 16 to move without compromising light provision to the optical modulation device in the projection chamber 14.

The number of fiber optic cables in cabling 72 will vary with design. Multiple fiber-optic cables may be employed in a design where each cable services one or more lasers. As shown in FIG. 7, light from the red diode laser 96a, the green diode laser 96b or the blue diode laser 96c is first transmitted into a fiber-optic cable dedicated to each laser; and subsequently routed and transmitted into a common fiber-optic cable 71. Each laser dedicated the fiber-optic cable thus receives laser light from an individual laser, and transmits the light to junction 75. In one embodiment, each fiber-optic cable attaches directly to an individual laser. For example, each fiber-optic cable may include a fixture with an inner threaded interface that matches a threaded interface disposed on an outside surface of a diode laser housing. Commercially available fiber-optic cables, such as that available from Ocean Optics Inc. of Dunedin, Fla., may come standard with such coupling and alignment fixtures. In a specific embodiment, a short focal length normal or GRIN lens is mounted at the inlet end of each cable to facilitate laser-to-fiber light transition and collimated transfer into each cable.

Junction 75 permits transmission of light from fiber-optic cables 72 into converging optics 77, and into the common fiber-optic cable 71. Converging optics 77 redirect incoming light from each fiber-optic cable into the common fiber-optic cable 79 and comprise a converging lens 77a that redirects light toward a re-collimating lens 77b, which collimates and re-directs incoming laser light from the converging lens 77a into the common optical fiber 79. Although not shown, junction 75 may also include a rigid structure, such as a suitably dimensioned molded plastic, that fixtures (e.g., holds and positions) fiber-optic cables and the common fiber-optic cable 79. In a specific embodiment, junction 75 comprises an optical adhesive that adheres cables directly to converging lens 77a. In another specific embodiment, at the outlet end 72b, the fiber-optic cables are combined into a larger cable that contains multiple fibers. Multiple fiber cables, such as fiber ribbon-based cables and those that employ multiple fibers located circumferentially within a round tube, are commercially available from a variety of vendors.

Multiple fiber-optic cable designs may be employed where each cable transmits a primary color. For example, three fiber-optic cables may be employed in which each cable transmits light from a primary color set of lasers along three different optical paths to three primary colors dedicated optical modulation devices.

Returning to FIG. 5, light chamber 65 may also employ other light source arrangements to generate light for the display device 10. Some light source arrangements, for example, may comprise an array of radiant light emitting diodes, e.g., characterized by radiant, non-lasing or non-collimated light generation. Similar to diode and DPSS lasers, radiant light emitting diodes consume less power and generate less heat than a white light lamp, and also emit colored light and thereby may operate without a color wheel. The chamber 65 may also include one or more dichroic mirrors in white light generation assemblies to separate red, green and blue light for transmission within fiber optic cables 72 to color dedicated optical modulation devices, such as three liquid crystal display (LCD) valves employed for red, green and blue control.

With continued reference to FIG. 5, the power supply 66 can be configured to electrical power to the light source 64 and other components within the display device 10 that rely on electrical power. Thus, the power supply 66 provides electrical energy to control the circuitry 76, the input/output circuitry 74, fans 62a and 62b, power diode 80 and components within the projection chamber 14 such as the optical modulation device 102 (FIG. 8). The power diode 80 is electrical communication with an external power switch 82 and illuminates when display device 10 is turned on to indicate whether display device 10 is on or off. A power cord port 81 receives a power cord, which couples the power supply 66 to an AC power source such as a wall power supply. In one embodiment, conversion of AC power to DC power occurs in a transformer included between ends of the power cord, as is common with many laptop computer power cords, thereby reducing the size of power supply 66, the base 12 and display device 10 and increasing portability of the display device 10. Circuitry within the power supply 66 may then convert incoming power to one or more DC voltages for specific components in the display device 10.

In another embodiment, the power supply 66 comprises at least one rechargeable battery 66a. The battery 66a may be recharged using power provided through power cord port 81. The battery 66a allows the display device 10 to operate on stored energy and without reliance on proximity to an AC power source, which further increases portability of the display device 10. For example, inclusion of a battery in the base 12 extends usage into a car, library, coffee shop, remote environment, or any other setting where AC and fixed power outlets are not readily available or within reach.

At least one fiber-optic cable 72 transmits light from the light source 64 to relay optics (FIG. 8) disposed along a light path between an exit end of fiber-optic cable 72 and the optical modulation device 102 in the projection chamber 14. With respect to device 10 structure, the fiber-optic cable 72 transmits light from one compartment to a separate compartment, namely, from the light source chamber 65 in the base 12 to the projection chamber 14. The number of fiber optic cables will vary with design. As mentioned above, multiple fiber-optic cables may be employed in a laser light generation design, for example, where each fiber-optic cable 72 services one or more diode lasers.

Alternatively, each fiber-optic cable 72 may service a primary color. For example, one fiber-optic cable may be used to transmit sequentially controlled red, green and blue lights generated by a diode laser array and transmitted along a single light path to a single mirror-based optical modulation device. Three fiber-optic cables may be employed to transmit light from a laser array that outputs red, green and blue lights into three fiber-optic cables, to three optical modulation devices that are each dedicated to modulation of a primary color.

The fiber-optic interface 70 facilitates transmission of light from each laser into the fiber-optic cabling 72. The fiber-optic interface 70 may include one or more fixtures that position and hold an inlet end for each fiber-optic cable included in fiber-optic cabling 72 such that light output from the light source transmits into a fiber-optic cable. The fiber-optic interface 70 may also include optics that direct light from lasers into the fiber-optic cabling 72. In one embodiment, a single fiber-optic cable is used in the cabling 72 and the fiber-optic interface 70 includes a lens system disposed between the outlet of a lamp or each laser and the inlet of the single fiber-optic cable to direct light into the cable.

The lens system may comprise at least two lenses: a first lens to direct the light towards the fiber entrance and a second lens that collimates light entering the cable. In another embodiment that implements a one-to-one laser to fiber-optic cable relationship; the fiber-optic interface 70 holds the inlet end for each fiber-optic cable relatively close to the outlet of each laser to receive light therefrom. Each cable in this case may include a converging lens at its inlet end that facilitates light capture and transmission into a cable. In another one-to-one design, each fiber-optic cable in fiber-optic cabling 72 includes a fixture that permits attachment to another object. For example, conventionally available fiber-optic cables available from vendors such as Ocean Optics Inc. of Dunedin, Fla. include a detachable fixture with a thread that allows screwing and fixing of the fiber-optic cable to a mating thread disposed on a laser housing. In this case, the fiber-optic interface 70 comprises the threaded fixture from each cable and the mating thread on the laser.

In a single path embodiment where red, green and blue lasers transmits colored light to a single optical modulation device along a single fiber-optic cable, the fiber-optic interface 70 receives colored light from each colored laser, in turn, according to timed control signals provided to the lasers by the control circuitry 76.

The input/output circuitry 74 provides an interface between control circuitry 76 and one or more input/output interfaces 78 (FIG. 5). The input/output interfaces 78 are configured to receive at least one cable, wire, or connector, such as a cable for transmitting a video signal comprising video data from a digital computing device. Common ports suitable for use with the input/output interfaces 78 include ports that receive S video cable, 6-pin mini DIN, VGA 15-pin HDDSUB female, an audio cable, component RCA through an S-Video adaptor, composite video RCA cabling, a universal serial bus (USB) cable, fire wire, etc. The input/output interfaces 78 may also include an audio output port for a wired connection to speakers employed by a headphone or speaker system.

The control circuitry 76 provides control signals to components within the base 12 and routes data from the input/output circuitry 74 to appropriate components within the display device 10. Thus, the control circuitry 76 provides control signals to the light source 64 that determine when the light source 64 is turned on/off. In addition, the circuitry 76 may include and access memory that stores instructions for the operation of components within the display device 10. For example, the circuitry 74 may provide control signals to control fans 62 according to stored heat regulation instructions. One or more sensors may also be disposed within the base 12 to facilitate thermal regulation. For example, a temperature sensor may be disposed proximate to the circuitry 74 and 76 to monitor temperature levels and participate in closed loop temperature control within the base 12 as controlled by the control circuitry 76.

The input/output circuitry 74 and input/output interfaces 78 collectively permit communication between the display device 10 and a device that outputs a video signal carrying video data. For example, desktop computers, laptop computers, personal digital assistants (PDAs), cellular telephones, video game consoles, digital cameras, digital video recorders, DVD players, and VCRs, may all be suitable to output video data to the display device 10. Video data provided to the control circuitry 76 may be in an analog or digital form. In some cases, the input/output circuitry 74 and control circuitry 76 convert analog video signals into digital video signals suitable for digital control of an optical modulation device included in the display device 10, such as a liquid crystal display "LCD" device or a digital micromirror "DMD" device. Thus, the input/output circuitry 74 or control circuitry 76 may also include support software and logic for particular connector types, such as processing logic required for S-video cabling or a digital video signal. The control circuitry 76 may also include and access memory that facilitates conversion of incoming data types and enhances video compatibility of the display device 10. Suitable video formats having stored conversion instructions within memory accessed by the control circuitry 76 may include NTSC, PAL, SECAM, EDTV, and HDTV (1080i and 720p RGBHV), for example.

When lasers are used for light generation within the light source 64 (FIG. 5), the control circuitry 76 receives video data included in a signal via one or more input/output interface 78 and the input/output circuitry 74, converts the data to color frame sequential data, and synchronizes the frame sequential data for delivery to the optical modulation device 102 (FIG. 8) and to each laser 96. In a single path design between lasers 96 and the optical modulation device 102 where one optical fiber transmits red, green and blue light in a time controlled sequential order, this includes synchronizing the timing of data sent to the optical modulation device 102 and on-off commands sent to lasers 96.

Figure 9:
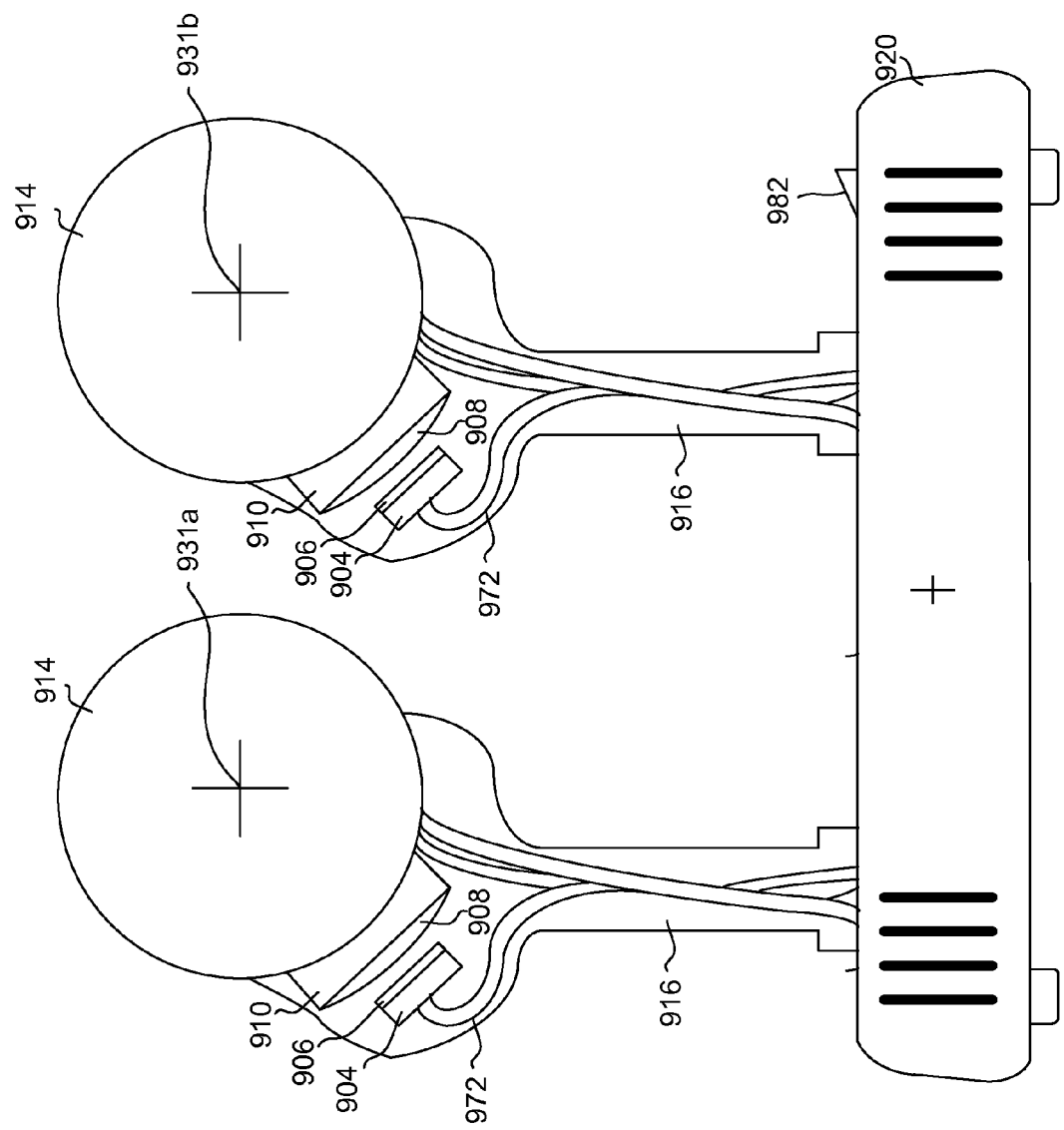
FIG. 9 shows a front view illustration of display device with two positional interfaces and lower projection chambers cutaway to show components therein in accordance with aspects.

FIG. 8 shows a simplified side view illustration of components within the projection chamber 14 of FIG. 2, taken through a vertical midpoint of projection chamber 14 along its cylindrical axis, in accordance with some present embodiments. FIG. 9 shows a front view illustration of the display device 920 with two projection heads having two positional interfaces 916 and lower projection chamber cutaway to show components therein. The projection chambers 914 comprise a optical modulation device, a fiber-optic interface 904, a relay optics system 906 and 908, a prism structure 910, a projection lens system, control and power cabling, and an air duct.

With reference to either projection head depicted for the device, the fiber-optic cabling 972 attaches to the fiber-optic interface 904 and outputs light to the relay optics 906. In one embodiment, the fiber-optic interface 904 secures the fiber-optic cabling 972 such that slack is provided for the fiber-optic cabling 972 between attachment at the fiber-optic interface 904 and attachment within the base. The slack allows the fiber-optic cabling 972 to deflect with positional interface 916 for various positions of the projection chamber 914 relative to the base.

Together, the fiber-optic cabling 972 and the fiber-optic interface 104 direct light generated by the light source to the prism 910. In one embodiment, the fiber-optic cabling 972 and interface 904 are configured with respect to the prism 910 so as to provide an optical path of incident light that is about perpendicular to an incident surface of prism 910. Some digital micro-mirror light modulator designs require that incoming light be incident on the light modulator from either above or below its light reflecting surface to allow light output along projection path 931a and 931b. The receiving interface of projection chamber housing 914 and the fiber-optic interface 904 ease this requirement and allow a designer to arrange the fiber-optic cabling 972 and fiber-optic interface 904 within the receiving interface such that the fiber-optic interface 904 directs light at a particular desired angle relative to prism 910, and onto the optical modulation device. For example, the fiber-optic interface 904 may be coupled to the receiving interface to provide an incident light path that is perpendicular onto an incident surface of prism 910 and has a 45 degree angle relative to the optical modulation device (e.g., prism 910 is rotated 45 degrees about projection paths 931a or 931b). Attachment between the fiber-optic interface 904 and the receiving interface maintains the desired incoming light angle despite changing positions of fiber-optic cabling 972 along its length caused by repositioning of positional interface 916.

The relay optics system 906 and 908 convert light receive from the fiber-optic cabling 972 to light suitable for transmission into the prism structure 910 and onto the optical modulation device 902. This may include shaping and resizing light flux received from the fiber-optic cabling 972 by using one or more lenses.

In another embodiment, the display device 920 comprises a pair of fly-eye lenses arranged in the optical path between the light source and prism 910. Cumulatively, the pair of fly-eye lenses uniformly distributes light received from the fiber-optic cabling 972 to the flux transmitted upon the optical modulation device. In a specific embodiment, the pair of fly-eye lenses are arranged on either and a fiber-optic cabling 972. The first fly-eye lens is disposed at the fiber-optic interface within the base, receives light from a lamp or diode laser array, and spatially divides the entire input light flux into a set of blocks or components that each comprises a portion of the total area of the inlet flux. Light for each block or component then travels down its own fiber-optic cabling 972. The second fly-eye lens comprises the same number of blocks or components and is disposed at the relay lens 906. The second fly-eye lens receives a fiber-optic cable for each block or component, and outputs light for each component such that the light from each component is expanded to span the downstream dimensions of optical modulation device and the projected image.

The prism structure 910 is an optical modulation system that provides light to the optical modulation device at predetermined angles. The prism structure 910 also transmits light from the optical modulation device to the projection lens system along projection paths 931a or 931b. The prism structure 910 comprises prism components that are separated by air space or bonding interface. The interface is disposed at such an angle so as to reflect light provided from fiber-optic cables 972 (and intermittent relay optics) towards the optical modulation device. In addition, the interface allows light reflected by the optical modulation device to transmit to the projection lens system along projection paths 931a or 931b.

The optical modulation device is configured to selectively transmit light to provide an output image along projection path 931a or 931b. To do so, the optical modulation device is supplied with video data included in a video signal and selectively transmits light according to the video data. The video data is typically provided to the optical modulation device on a frame by frame basis according to individual pixel values. If the video data is not received by the display device 920 in this format, the control circuitry in the base may convert the video data to a suitable format for operation of the optical modulation device. In one embodiment, individual light modulation elements within the optical modulation device, each of which corresponds to an individual pixel on the output image, translate received digitized pixel values into corresponding light output values for each pixel.

In a specific embodiment, the optical modulation device is a mirror based optical modulation device, such as a digital micro mirror device (or DMD, a trademark of Texas instruments Inc.) commercially available from Texas Instruments, Inc. In this case, the optical modulation device comprises a rectangular array of tiny aluminum micromechanical mirrors, each of which individually deflects about a hinged axis to selectively reflect output image light down projection paths 931a or 931b, and reflect non-image light away from projection paths 931a or 931b. The deflection state or angle of each mirror is individually controlled by changing memory contents of an underlying addressing circuit and mirror reset signal. The array of mirrors is arranged such that each mirror is responsible for light output of a single pixel in the video image. Control signals corresponding to pixel output are supplied to control electrodes disposed in the vicinity of each mirror, thereby selectively deflecting individual mirrors by electromagnetic force according to video data on a pixel by pixel basis. Light reflected by each mirror is then transmitted along projection paths 931a or 931b, through prism structure 910, and out of projection chamber 914 using projection lens system.

A controller can be included with the optical modulation device and provides control electrical signals that direct each micromechanical mirror to desired light reflecting states corresponding to pixel video data for each pixel. The control and power cabling provides electrical communication between the controller and the control circuitry in the base. Thus, at least one electrical connector included in the control and power cabling couples to the controller in the projection chamber 914 and to control the circuitry in the base, and provides electrical communication therebetween. A power line within the control and the power cabling extends between the optical modulation device in the projection chamber 914 and the power supply in the base, and provides power from the power supply to the optical modulation device. The control and power cabling then travels through positional interface 916, which includes one or more holes or apertures that allow the control and power cabling to pass through without impingement on the control and power cabling for any position of projection chamber 914. In one embodiment, the control and power cabling passes through a plastic tube in the positional interface 916 to further protect the wires.

The illumination angles for optical modulation device are set by the output direction of fiber-optic interface 904, arrangement of relay optics 906 and 908, and the faces of prism structure 910. After light reflection by individual mirrors of the optical modulation device, reflected light exits prism structure 910 towards lenses along projection paths 931a or 931b.

As shown in FIG. 8, vents 118 are disposed on an aft portion of projection chamber housing proximate to the optical modulation device 102. An air duct 122 includes a high-pressure end proximate to the optical modulation device 102 and the controller 114, and a low pressure end disposed within the base 12. As mentioned above with respect to FIG. 5, fans 62a and 62b draw air within the base 12 and exhaust air out through exhaust vents 24b, which creates a negative pressure within the base 12 relative to the ambient room or surroundings. Correspondingly, fans 62a and 62b create a negative pressure for the end of air duct 122 within base 12 relative to the opposite end in projection chamber 14, which would otherwise rest at room pressure due to vents 118. By disposing one end of air duct 122 within the base 12 and the other end in a space 125 around the optical modulation device 102, fans 62 thus draw air from the space 125 and cool the optical modulation device 102. Cumulatively, cool air is drawn from the ambient surroundings around the projection chamber 14, through vents 118 and into a space 125 surrounding the optical modulation device 102, into duct 122 at end 122a, through duct 122, out duct 122 at end 122b, into base 12, and out air vents 24b. Continually running fans 62 maintains end 122b at a low pressure relative to end 122a, and thus provides continual cooling for the optical modulation device 102.

A projection lens system 112 is disposed along projection path 31 for outputting light transmitted by the optical modulation device along projection path 31. The projection lens system 112 manipulates image light transmitted by the optical modulation device 102 along projection path 31 such that a projected image cast on a receiving surface enlarges as distance from the output optical projection lens 37 to the receiving surface increases. The projection lens system 112 comprises lenses 112a, 112b, 112c and the output optical projection lens 37, each of which are disposed centrically along and orthogonal to projection path 31. Distances between each lens may vary with a desired splay angle from the output optical projection lens 37, as may the number of lenses used. In one embodiment, the display device 10 is designed for a short throw distance, such as between about six inches and about fifteen feet. The display device 10 may also include one or more buttons or tools that allow a user to manually focus and manually zoom the output from the projection lens system 112. The projection chamber 14 may also include a lens between the optical modulation device 102 and the prism 110 that converges image light reflected by the optical modulation device 102 towards projection path 31. This allows a reduction in output lens 112a-c diameters and a corresponding reduction in diameter and size for the projection chamber 14.

In some other embodiments, other types of light modulators and light path designs may be employed. For example, the fiber-optic cabling 72 may be arranged for a multiple light path design to transmit light to three primary color dedicated LCD optical modulators, or to three primary color dedicated DMD optical modulators. In the case of an LCD optical modulation device, selective transmission of light comprises selective passage of light through a liquid crystal medium on a pixel by pixel basis.

In addition, although the base 12 has been primarily described with respect to components dedicated to projection functionality, it is understood that the base 12 may be inclusive in a larger system, or comprise components not directed solely to display device 10 output. For example, the base 12 may be part of a computer housing that includes components for projection functionality and components for computer functionality in a computer system, such as a desktop computer. Computer functionality components may include a processor, a hard drive, one more interface and control boards, a disk or floppy drive, etc. In this case, housing 20 is considerably larger to accommodate the combined functionality and components. In addition, some components may be shared, such as a power supply and fans used for movement of air within the housing.

Figure 10:
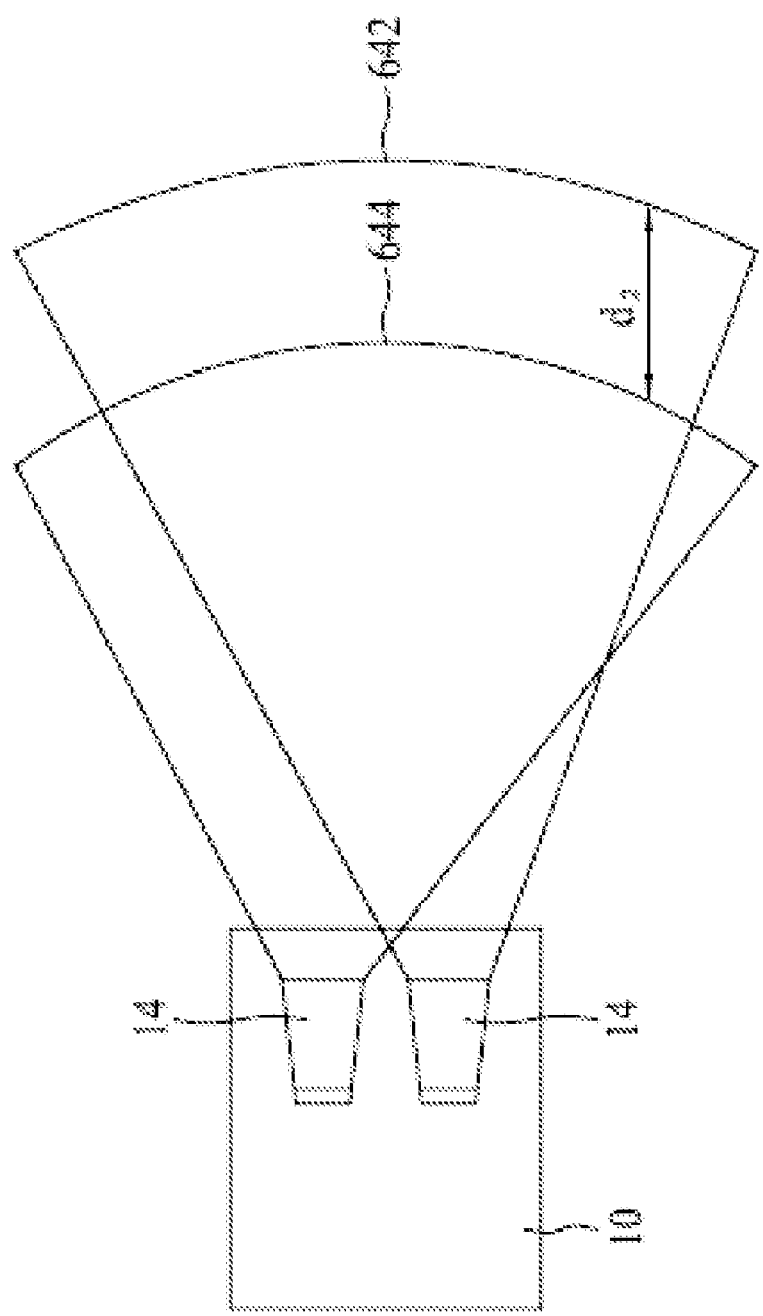
FIG. 10 shows an example configuration of front and rear receiving surfaces in accordance with embodiments of the innovation.

The configuration of the receiving surfaces 13 and 15 may vary with different projection environments. FIG. 10 shows another example configuration of front and rear receiving surfaces. FIG. 10 shows projection type stereoscopic device 10 cast video images on to two curved surfaces 642 and 644. The front surface 642 and the rear surface 644 which are spaced a predetermined distance $d_1$ from each other. The two curved surfaces has substantive same radius of curvature so that a viewer can enjoy the projected images in front of the receiving surfaces.

Figure 11:
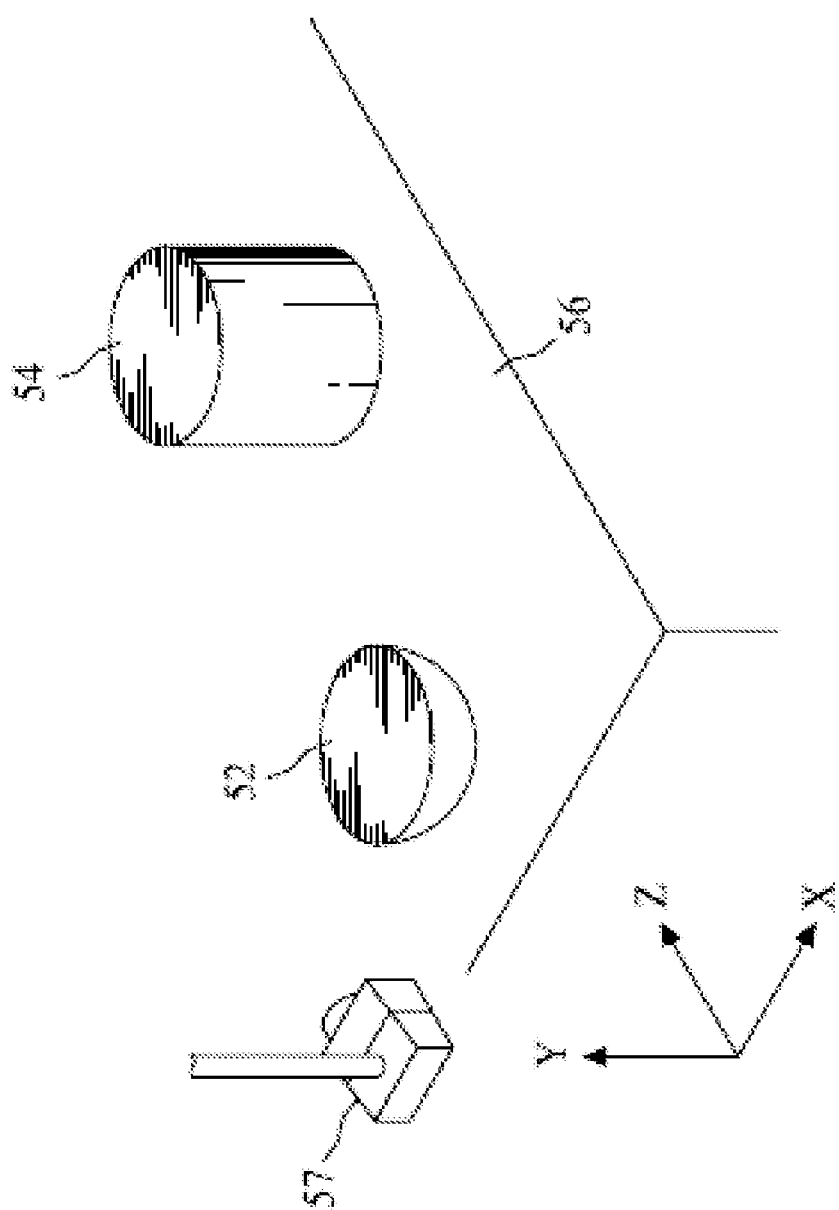
FIG. 11 is a perspective view illustrating objects to be photographed by a camera in one aspect.
Figure 12:
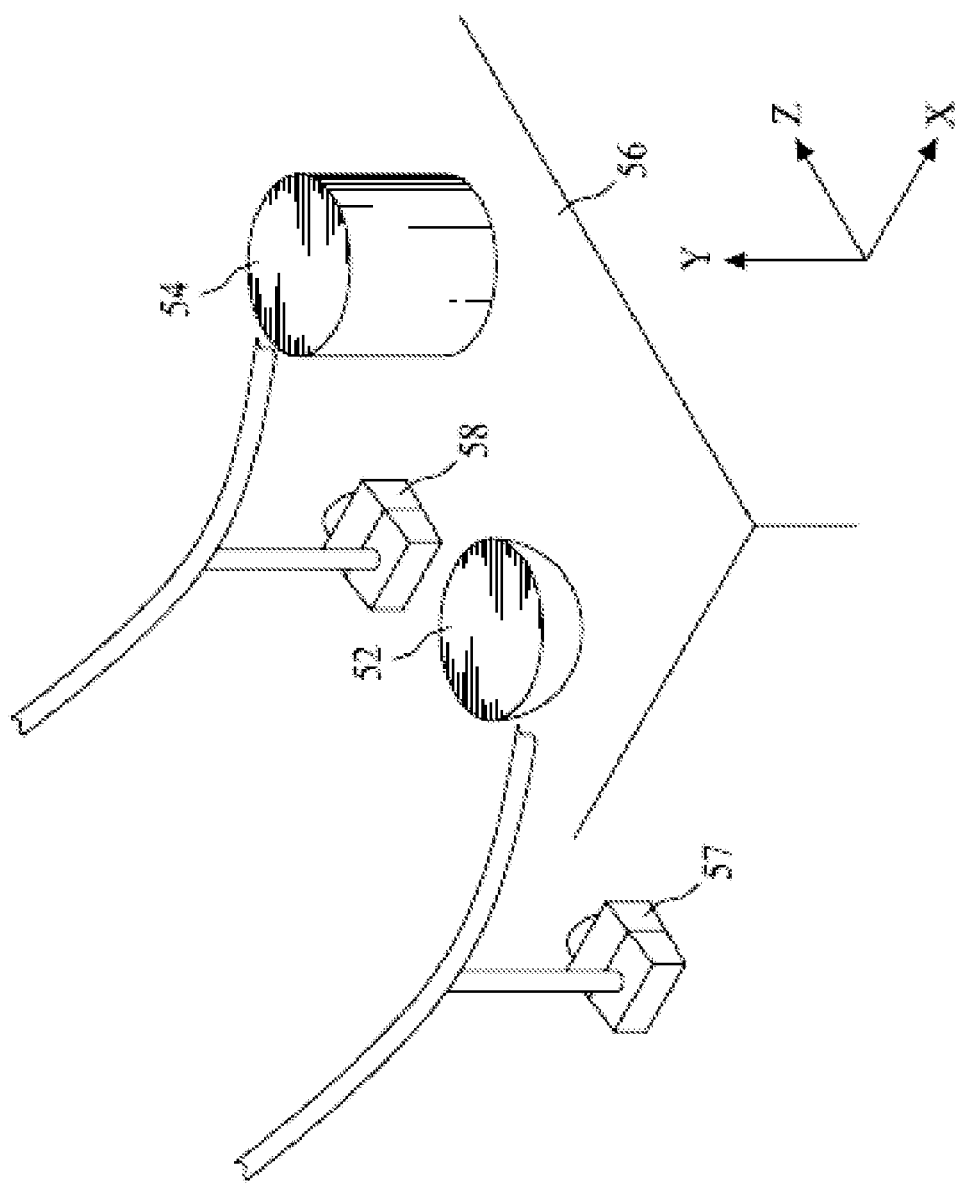
FIG. 12 shows the first and second images are filmed by different cameras in one aspect.

The source of video images may vary with embodiments. FIG. 11 is a perspective view illustrating objects to be filmed by a camera 57 in accordance with one of the present embodiments. A hemispheric object 52 and a cylindrical object 54 are placed on a table 56 to be spaced a predetermined distance in a Z direction from each other. In some embodiments, near objects and far objects are recorded by different cameras 58a and 58b, as depicted in FIG. 12. The camera 58a and 58b may be mounted on rails 59a and 59b, respectively, so that the 360-degree views of near objects and far objects can be filmed separately. In yet some embodiments, the sources of video images are not video record but computer-generated images, for example, game consoles. The game consoles may compute the 360-degree views of each object from its 3D models and thus not have to allocate a memory for exhaustively storing the 360-degree views of each object. However, it should be noted that there are a variety of ways of generating video that can benefit from parallax representation, and that the various embodiments herein are therefore not limited to any particular kind of graphical, image or video content.

Figure 13:
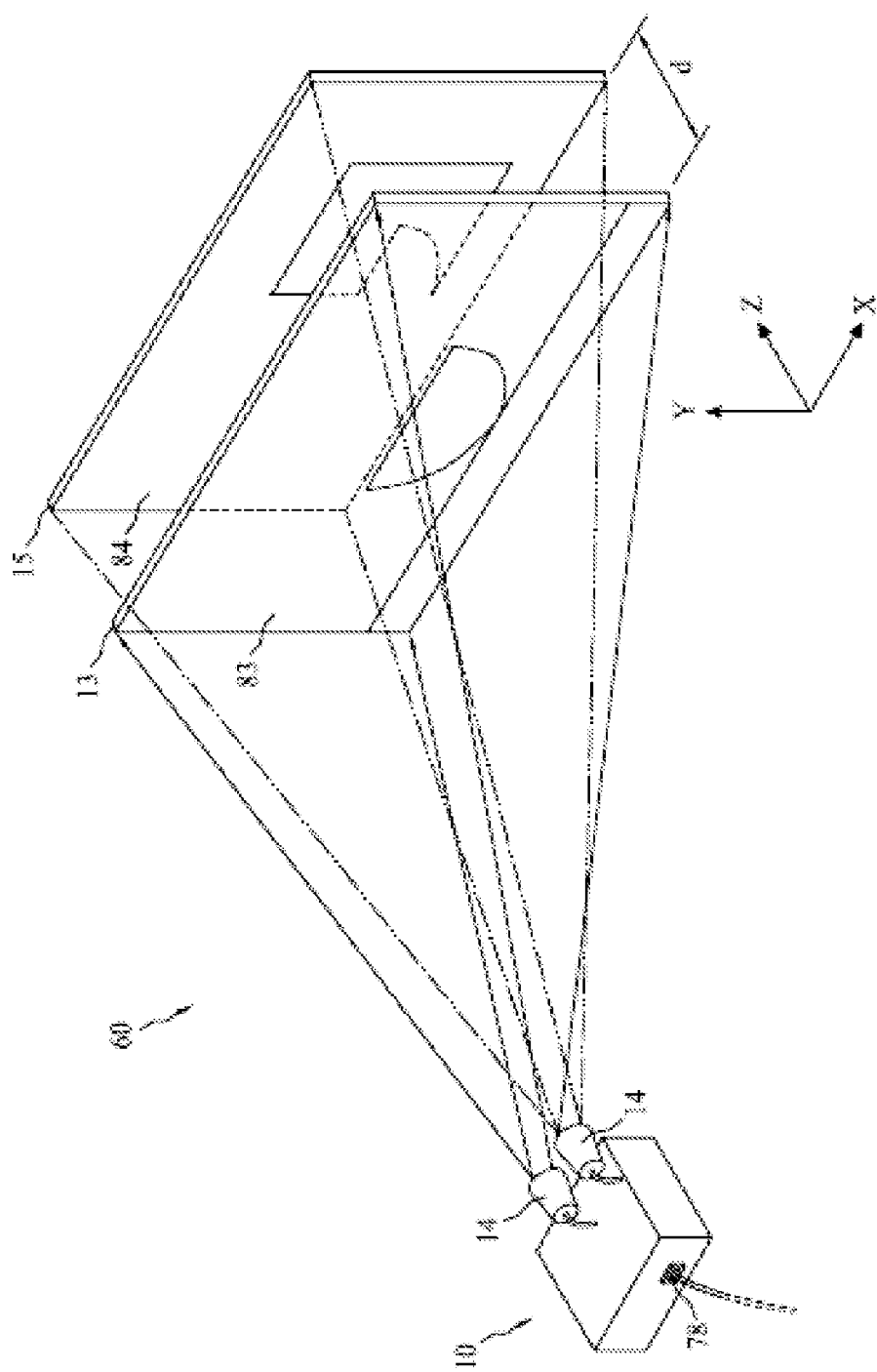
FIG. 13 shows a perspective view of a projection type stereoscopic display system according to one of the present embodiments.

FIG. 13 shows a perspective view of a projection type stereoscopic display system 60 according to one of the present embodiments. The projection type stereoscopic display system 60 includes a display device 10, a first receiving surface 13 and a second receiving surface 15 which are spaced a predetermined distance d from each other. In one embodiment, the projection type stereoscopic display system 60 creates a stereoscopic image by separating an original video image filmed by single camera into a first image 83 and a second image 84, and separately projects the first image 83 and the second image 84 to the first receiving surface 13 and the second receiving surface 15, respectively. The original image may be inputted to projector 10a via input/output interface 78. In other embodiments, the first image 83 and second image 84 are captured from different cameras.

Figure 14:
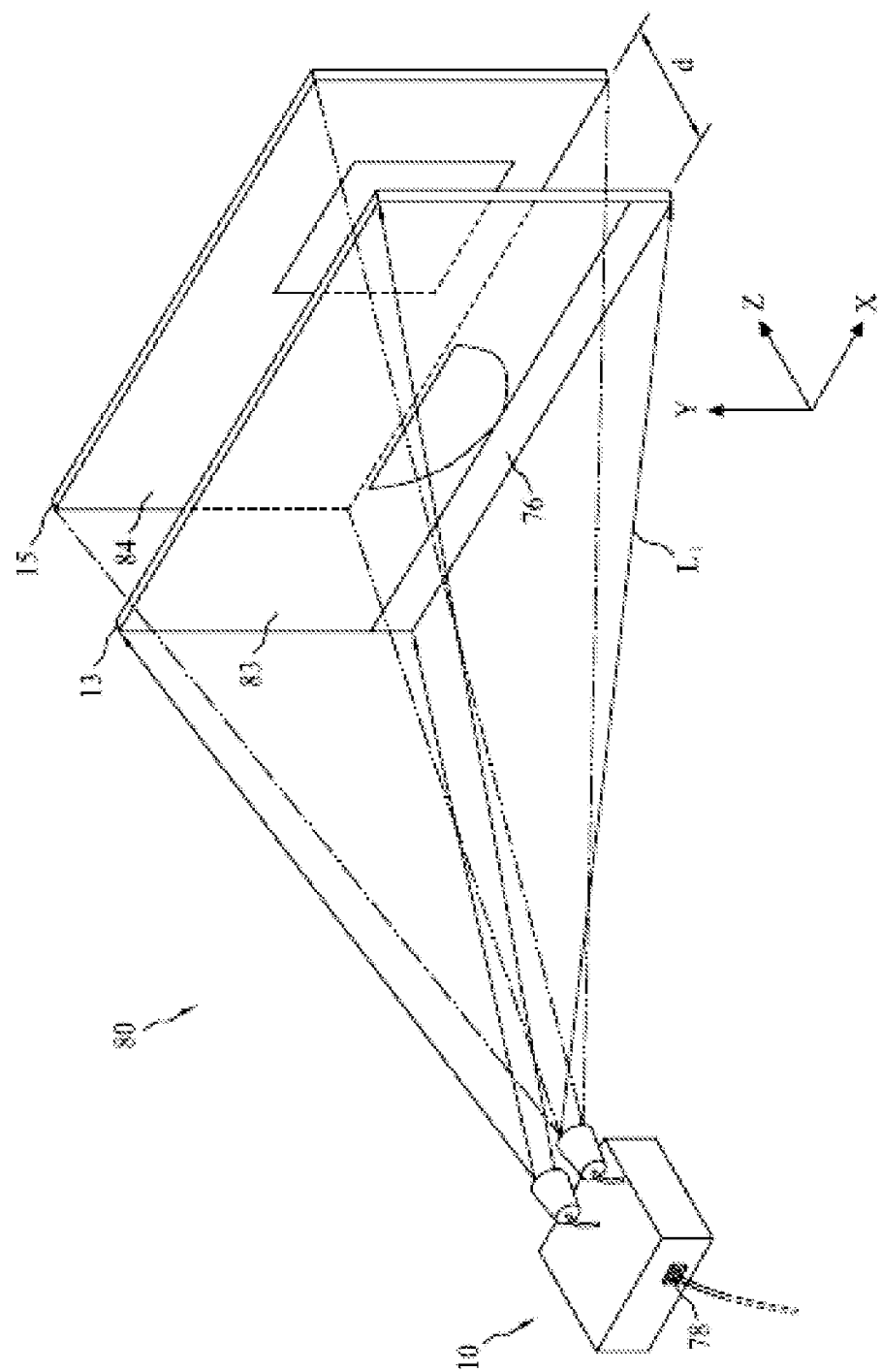
FIG. 14 shows another perspective view of a projection type stereoscopic display system according to one of the present embodiments.

FIG. 14 shows another embodiment of perspective view of projection type stereoscopic display system. In this embodiment, the whole cylindrical object is projected on the receiving surface 15, yet a viewer still see a portion of the cylindrical object blocked by the hemispheric object.

Figure 15:
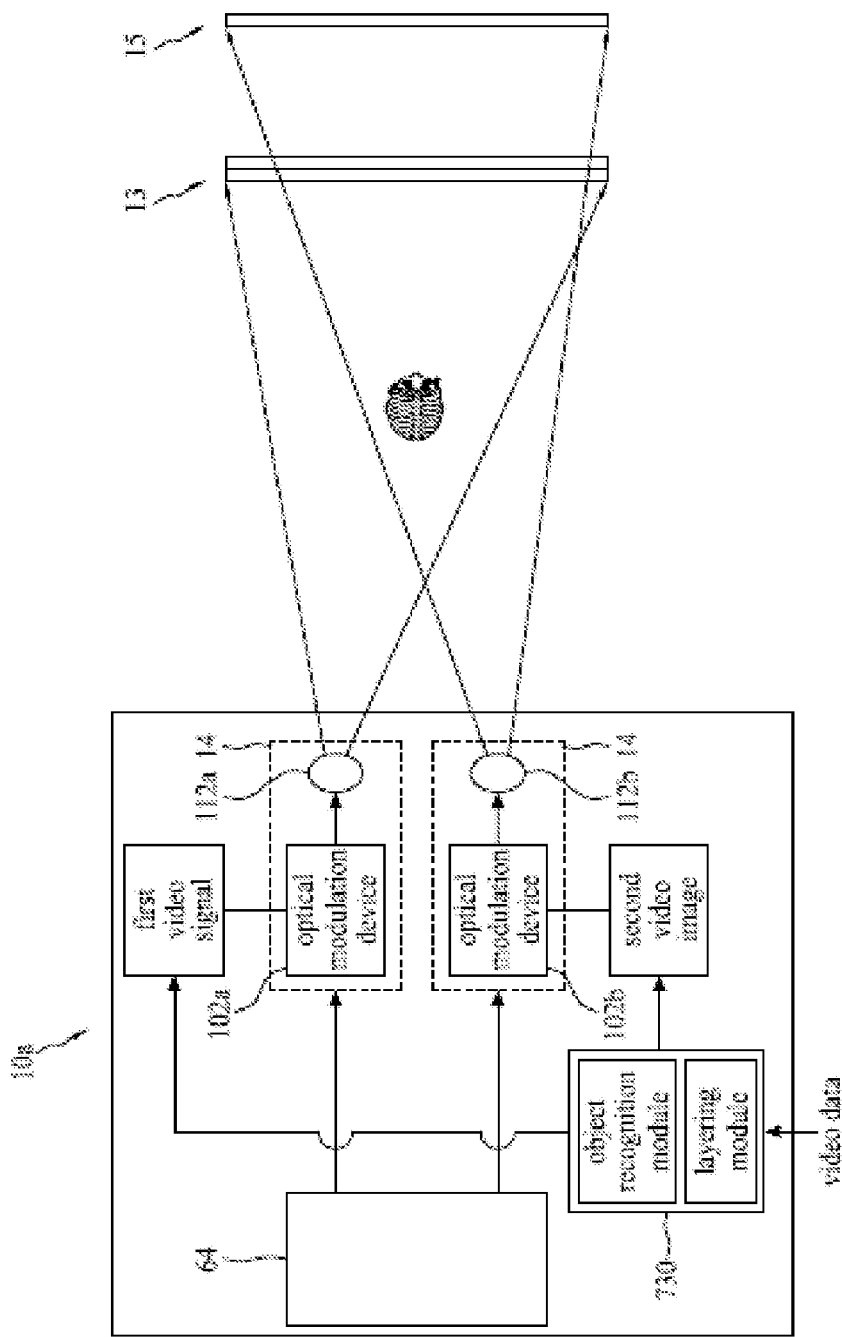
FIG. 15 shows a simplified schematic chart of projector when having one video stream input in an aspect.
Figure 17A:
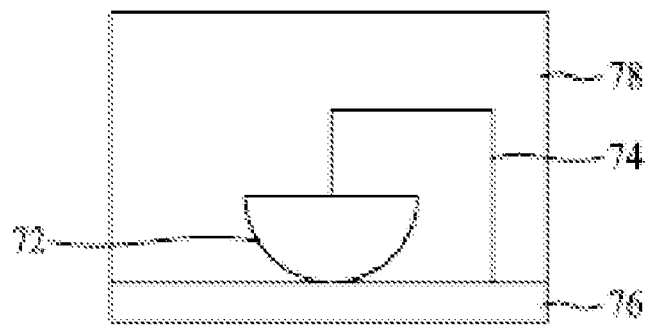
FIGS. 17A, 17B and 17C show various video data inputted to a projector in accordance with some embodiments.
Figure 17B:
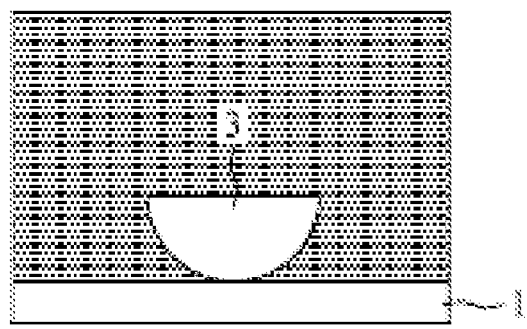
Figure 17C:
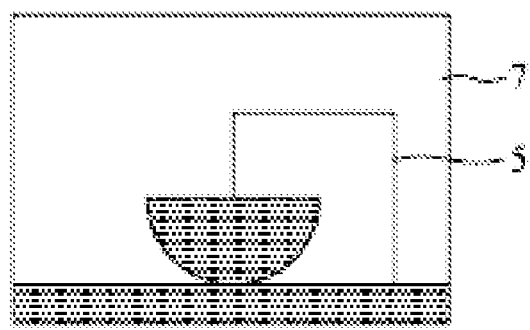

FIG. 15 shows a simplified schematic chart of projector 10a when having one video stream input. The projector 10a may further comprise an object recognition module and a layering module. These two modules may be coupled to a control circuitry 76, or be established in the control circuitry 76. The object recognition module identifies objects from the video data. For example, the video data shown as FIG. 17A is input to the projector 10a. The object recognition module identifies that there are hemispheric object 72, cylindrical object 74, table 76 are contained in the video data. The layering module extracts near objects from the video data to form a first video signal and to form the rest of the video data as a second video signal. For example, the hemispheric object 72 and the table 76 is closer to the viewer than the cylindrical object 74 is. The layering module then extracts the hemispheric object 72 and table 76 from the video data to form a first video signal, as shown in FIG. 17B, and leaves rest of the objects other than the first video signal as a second video signal, as shown in FIG. 17C. A first optical modulation device modulate light according to the first video signal, and a second optical modulation device modulate light according to the second video signal.

Figure 16:
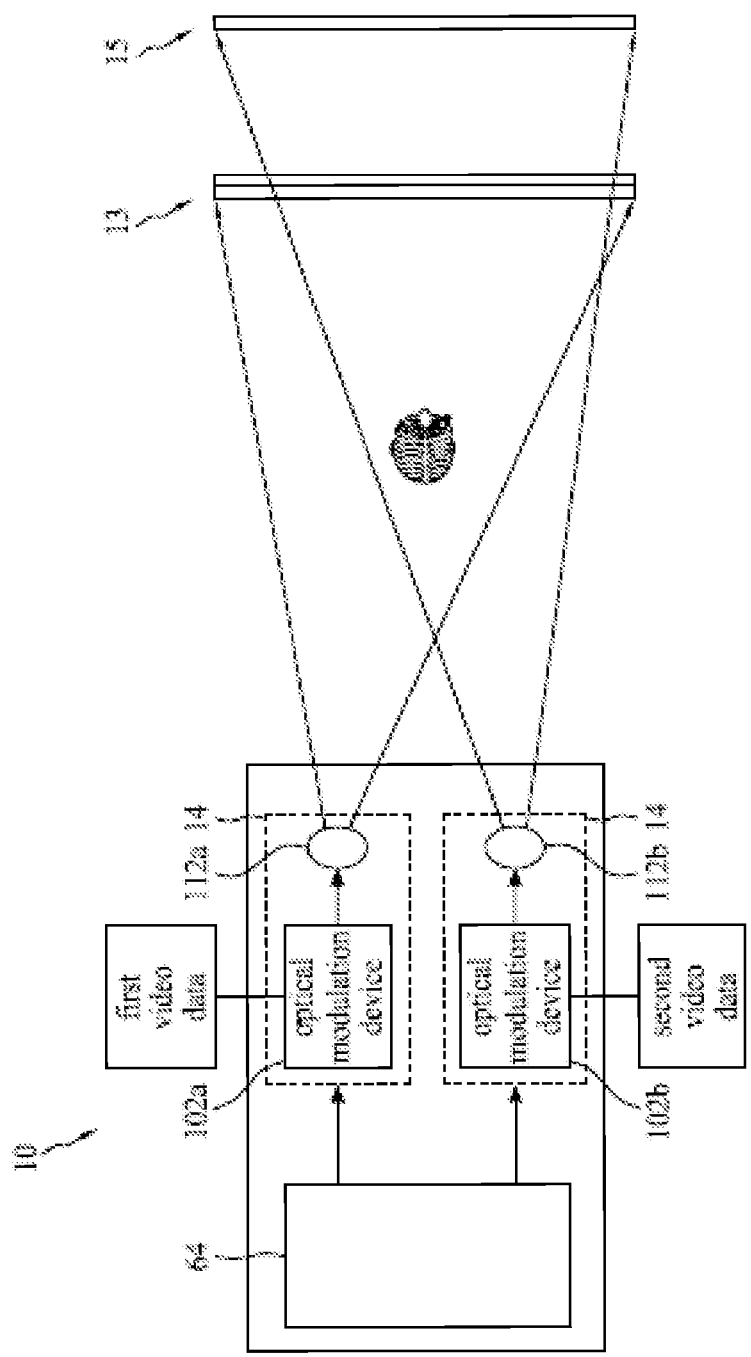
FIG. 16 shows another simplified schematic chart of projector when having at a first video data and a second video data in an aspect.

FIG. 16 shows another simplified schematic chart of projector 10a when having at a first video data and a second video data. In this embodiment, video data shown as FIG. 17B and FIG. 17C are input to projector 10a respectively. The video data inputted to projector 10a may be video record(s) or computer-generated graphic.

Figure 18:
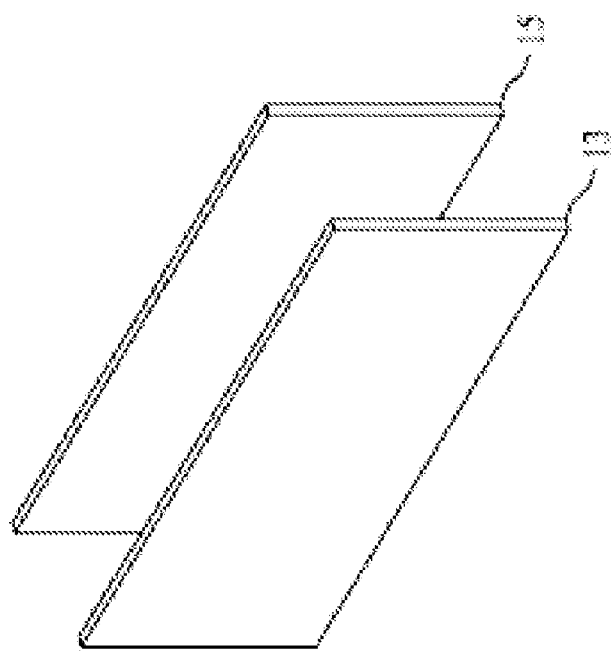
FIG. 18 shows an example arrangement of projection type stereoscopic display system.
Figure 18:
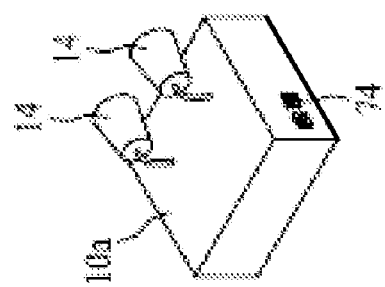

The alignment of two projection images can be done by manually adjusting projecting chambers. In other embodiments, the projection images are aligned by automated calibration. FIG. 18 shows an example arrangement for image alignment in accordance with one embodiment. For example, the projector 10a cast either the first image or the second image at a time. The first image or second image can be just reference line to simplify the alignment process. The image (s) can be sent to the projector 10a, e.g., received via an input/output interface such as a camera included in the projector. The camera image(s) may then be processed by an image alignment module of the projector 10a.

The image alignment module determines angles to be adjusted of the projection chamber then forwards the angles to a projection head position controller. In one embodiment, the image alignment module has an image recognition module, an arithmetic unit, and a parameter calibrator. The image recognition module identifies the 3D coordinates of the first projected image and the second projected image. The arithmetic unit computes the differences in x-, y-, and z-coordination of the first projected image and the second projected image. The parameter calibrator can then determine a set of parameters representing angles the projection chamber should be adjusted. The parameters are sent to the projection head position controller to refine the alignment of the two projection heads or their respective images.

Figure 19:
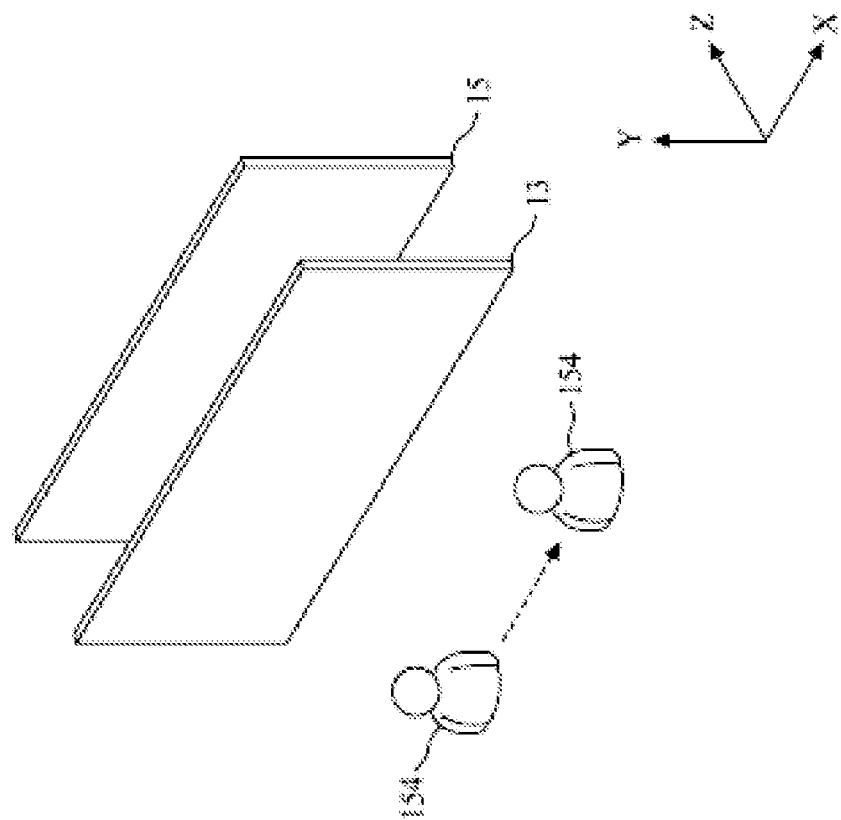
FIG. 19 shows an example arrangement of projection type stereoscopic display system.
Figure 21A:
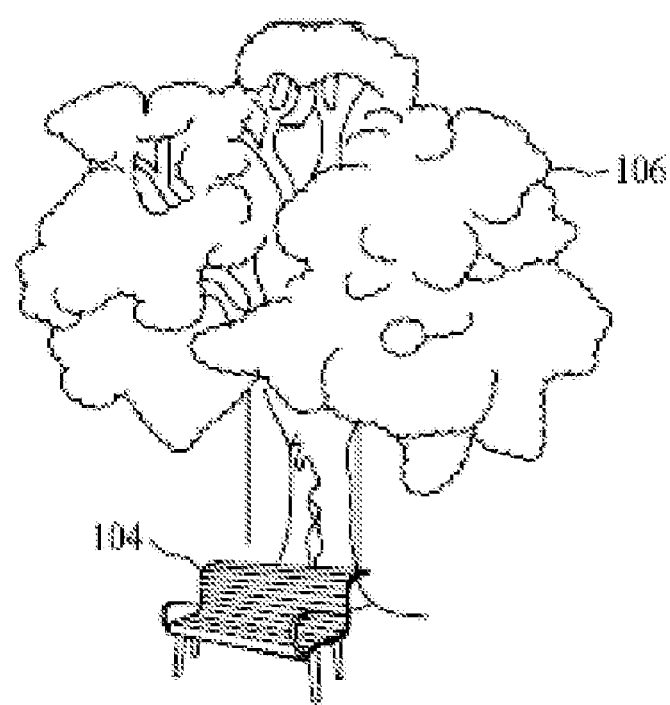
FIGS. 21A and 21B illustrate motion parallax for stereoscopic view in accordance with one of the present embodiments.
Figure 21B:
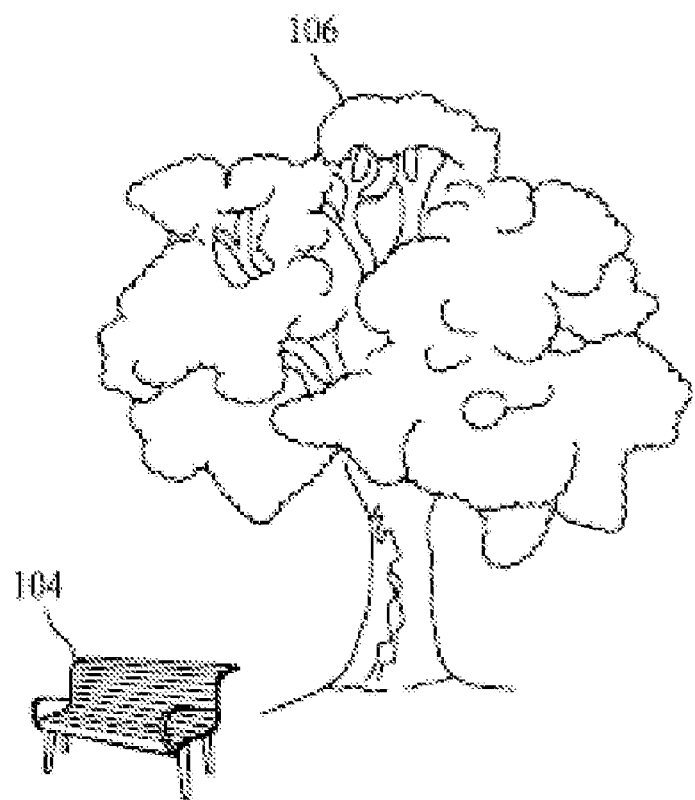

To achieve better perception of stereoscopic display, the positions of projected objects relative to each other may appear to shift due to changes in the relative angular position of the viewer. This human perceptual characteristic is also called motion parallax. Motion parallax provides depth perception to a viewer because, as a viewer moves, objects that are closer to the viewer move farther across the field of view than objects that are in the distance. FIG. 19 illustrates the positional change of a viewer 154 relative to the receiving surfaces. FIGS. 21A and 21B illustrate how motion parallax be presented when the viewer moves along x axis. FIG. 21A illustrates projected images in which a park bench 104 (front image) is placed under a tree 106 (rear image). FIG. 21B shows a different projected images when the viewer moves along x axis in front of the projected images. The park bench 104 is not under tree 106 anymore but actually some distance laterally away from the tree.

Figure 20:
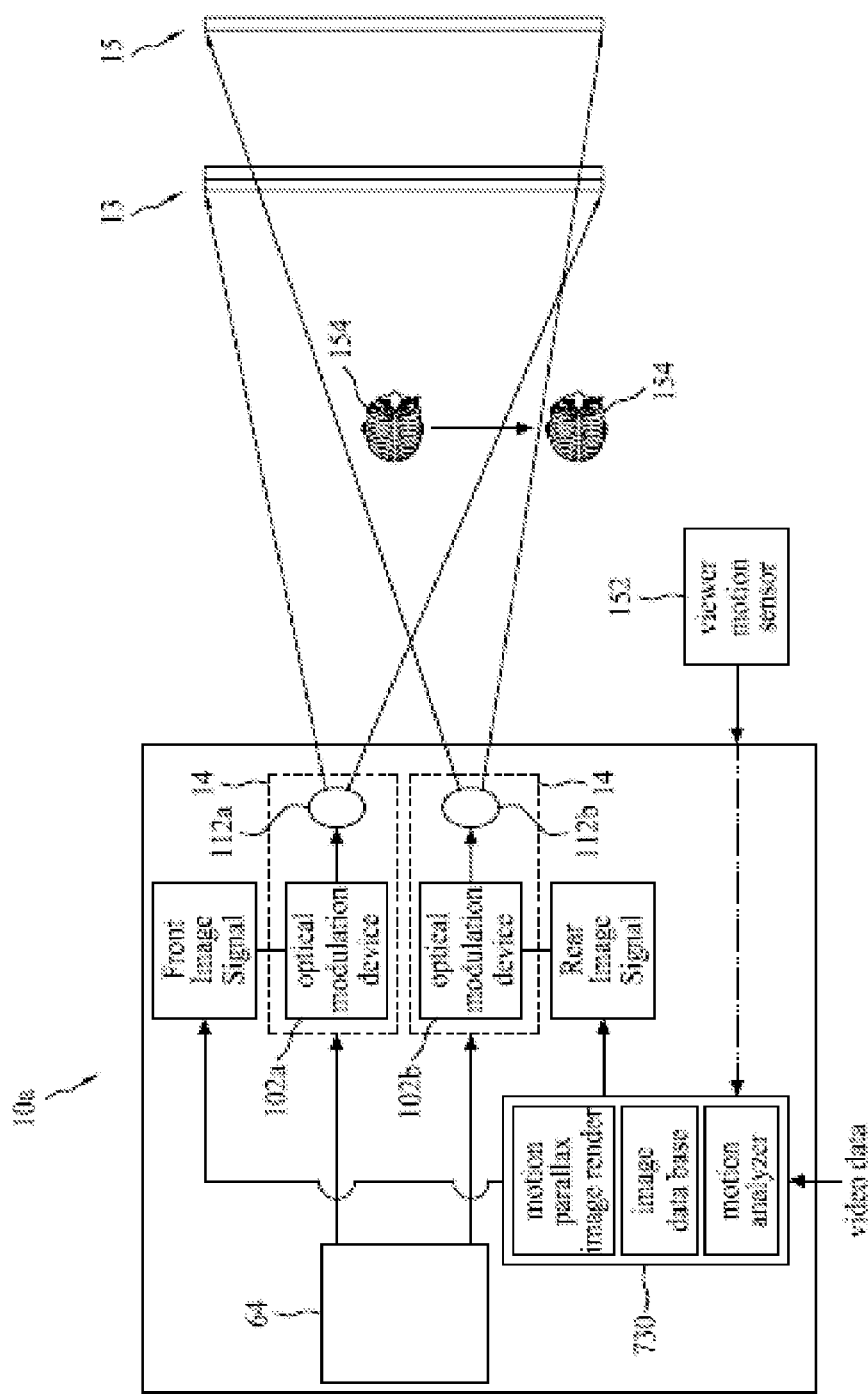
FIG. 20 shows an example block diagram of a display system that interactively employs motion parallax in accordance with one embodiment.

FIG. 20 shows an example block diagram of the display system to interactively showing motion parallax. A projector 10*a* having at least two projection lenses 112*a* and 112*b* for projecting a first image and a second image on a first surface and on a second surface respectively. The updated video images are sent to optical modulation device 102*a* and 102*b* to display a motion parallax depiction. The image data base can be built from video images shoot from one or more camera, or from computer-generated graphics.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
   a first projection chamber configured to project light including a first image of a set of image data at a first angle corresponding to a first lenticular lens located on a first surface; and
   a second projected chamber configured to project light including a second image of the set of image data at a second angle corresponding to a second lenticular lens located on a second surface arranged at a fixed distance from the first surface, wherein the first angle differs from the second angle.

2. The device of claim 1, further comprising an image layering component configured to determine the fixed distance from the first surface to the second surface based on a positional relationship between the first and second images.

3. The device of claim 1, further comprising:
   a plurality of light source sets configured to generate a plurality of colored lights, wherein a color of a colored light generated by a respective light source set of the plurality of light source sets is different than colors of colored lights generated by others of the plurality of light source sets; and
   a switch configured to receive light from the plurality of light sources sets and to divert the plurality of colored lights from the plurality of light sources sets according to a predetermined timing order to the first and second projection chambers wherein the first and second projection chambers respectively receive differing colored lights concurrently and receive the plurality of colored lights at least once.

4. The device of claim 3, wherein the switch is further configured to divert the plurality of colored lights according to the predetermined timing order comprising a varying lasting time for diversion of the colored lights.

5. The device of claim 3, wherein the plurality of light source sets comprise a red light source set, a green light source set, and a blue light source set.

6. A method, comprising:
   projecting, from a first projection device, light including a first image at a first angle corresponding to a first lenticular lens located on a first surface; and
   projecting, from a second projection device, light including a second image at a second angle corresponding to a second lenticular lens located on a second surface arranged at a fixed distance from the first surface, wherein the first angle differs from the second angle.

7. The method of claim 6, further comprising determined the fixed distance from the first surface to the second surface based on a positional relationship between the first and second images.

8. The method of claim 6, further comprising:
   generating a plurality of colored lights from a plurality of light source sets including generating a color of a colored light, by a respective light source set of the plurality of light source sets, wherein the color is different than colors of the plurality of colored lights generated by others of the plurality of light source sets; and
   diverting the plurality of colored lights from the plurality of light sources sets according to a predetermined sequential order to the first and second projection devices including directing the plurality of colored lights to the first and second projection devices to respectively receive differing colored lights concurrently and receive the plurality of colored lights at least once.

9. The method of claim 8, further comprising diverting the plurality of colored lights according to the predetermined sequential order comprising a varying lasting time for diverting the plurality of colored lights.

10. The method of claim 8, wherein generating the plurality of colored lights comprises generating red colored lights, green colored lights, and blue colored lights.

11. A system, comprising:
    means for projecting a first light including a first image at a first angle corresponding to a first lenticular lens located on a first surface; and
    means for projecting a second light including a second image at a second angle corresponding to a second lenticular lens located on a second surface arranged at a fixed distance from the first surface, wherein the first angle differs from the second angle.

12. The system of claim 11, further comprising selecting the fixed distance from the first surface to the second surface based on a positional relationship between the first and second images.

13. The system of claim 11, further comprising:
    means for generating a plurality of colored lights; and
    means for diverting the plurality of colored lights according to a predetermined sequential order to the means for projecting the first light and the means for projecting the second light wherein the means for projecting the first light and means for projecting the second light respectively receive differing colored lights concurrently and receive the plurality of colored lights at least once.

14. The system of claim 13, further comprising means for diverting the plurality of colored lights according to the predetermined sequential order comprising a varying lasting time for diverting the plurality of colored lights.

15. The system of claim 13, wherein the means for generating the plurality of colored lights comprises means for generating red colored lights, green colored lights, and blue colored lights.

16. A non-transitory computer readable medium having instructions stored thereon that, in response to execution, cause at least one device to perform operations comprising, comprising:

projecting, from a first projection device, light including a first image at a first angle corresponding to a first lenticular lens located on a first surface; and projecting, from a second projection device, light including a second image at a second angle corresponding to a second lenticular lens located on a second surface arranged at a fixed distance from the first surface, wherein the first angle differs from the second angle.

17. The non-transitory computer readable medium of claim 16, further comprising:

generating a plurality of colored lights from a plurality of light source sets, wherein a color of a colored light generated by a respective light source set of the plurality of light source sets is different than colors of colored lights generated by others of the plurality of light source sets; and diverting the plurality of colored lights from the plurality of light sources sets according to a predetermined sequential order to the first and second projection devices including directing the differing colored lights to the first and second projection devices to concurrently receive the differing colored lights and receive the plurality of colored lights at least once.

18. The non-transitory computer readable medium of claim 16, further comprising diverting the plurality of colored lights according to the predetermined sequential order comprising a varying lasting time for diverting the plurality of colored lights.

* * * * *

UNITED STATES PATENT AND TRADEMARK OFFICE
CERTIFICATE OF CORRECTION

PATENT NO. : 8,203,600 B2  
APPLICATION NO. : 12/478259  
DATED : June 19, 2012  
INVENTOR(S) : Plut Page 1 of 1

It is certified that error appears in the above-identified patent and that said Letters Patent is hereby corrected as shown below:

In Column 4, Lines 39-40, delete "sidewallsOne" and insert -- side walls. One --, therefor.

In Column 17, Line 46, in Claim 1, delete "projected" and insert -- projection --, therefor.

In Column 18, Line 21, in Claim 7, delete "determined" and insert -- determining --, therefor.

In Column 19, Lines 11-12, in Claim 16, delete "comprising, comprising:" and insert -- comprising: --, therefor.

Signed and Sealed this  
Sixteenth Day of October, 2012

David J. Kappos  
*Director of the United States Patent and Trademark Office*